(12) United States Patent
Choi et al.

(10) Patent No.: US 12,055,981 B2
(45) Date of Patent: Aug. 6, 2024

(54) ELECTRONIC DEVICE INCLUDING DISPLAY CHANGING IN SIZE AND CONTROL METHOD THEREFOR

(71) Applicant: LG ELECTRONICS INC., Seoul (KR)

(72) Inventors: Won Kwang Choi, Seoul (KR); Seung Soo Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 17/772,931

(22) PCT Filed: Oct. 28, 2019

(86) PCT No.: PCT/KR2019/014275
§ 371 (c)(1),
(2) Date: Apr. 28, 2022

(87) PCT Pub. No.: WO2021/085658
PCT Pub. Date: May 6, 2021

(65) Prior Publication Data
US 2023/0029563 A1    Feb. 2, 2023

(51) Int. Cl.
*G06F 1/16*    (2006.01)
*G06F 3/0488*    (2022.01)

(52) U.S. Cl.
CPC .......... *G06F 1/1677* (2013.01); *G06F 1/1624* (2013.01); *G06F 1/1652* (2013.01); *G06F 3/0488* (2013.01)

(58) Field of Classification Search
CPC .... G06F 1/1677; G06F 1/1624; G06F 1/1652; G06F 3/0488
See application file for complete search history.

(56) References Cited

U.S. PATENT DOCUMENTS 10,216,398 B2 *    2/2019    Woo .................. G09G 5/373
10,613,809 B2    4/2020    Lee et al.
(Continued)

FOREIGN PATENT DOCUMENTS

EP    3531230    8/2019
KR    1020150008982    1/2015
(Continued)

OTHER PUBLICATIONS

PCT International Application No. PCT/KR2019/014275, Written Opinion of the International Searching Authority dated Jul. 22, 2020, 4 pages.
(Continued)

*Primary Examiner* — Sejoon Ahn
(74) *Attorney, Agent, or Firm* — LEE, HONG, DEGERMAN, KANG & WAIMEY

(57) ABSTRACT

According to an example embodiment of the present disclosure, an electronic device includes a motor, a flexible display disposed to be changed in a size to which the flexible display is exposed to one side in accordance with an operation of the motor, a processor configured to control the display and the motor, and the processor may identify event information associated with a change in a size of an exposed display, identify an operation pattern of the motor based on the event information, and change the size of the exposed display based on the identified operation pattern.

20 Claims, 27 Drawing Sheets

(56) References Cited

U.S. PATENT DOCUMENTS

| | | | |
|---|---|---|---|
| 2009/0127006 A1* | 5/2009 | Lynggaard | G06F 3/03545 |
| | | | 178/19.01 |
| 2016/0306534 A1 | 10/2016 | Woo et al. | |
| 2018/0032152 A1 | 2/2018 | Pan et al. | |
| 2019/0261519 A1 | 8/2019 | Park et al. | |
| 2021/0158783 A1 | 5/2021 | Lee et al. | |
| 2021/0311696 A1* | 10/2021 | Shi | G06F 3/016 |
| 2021/0312523 A1* | 10/2021 | Luo | G06V 10/56 |
| 2021/0390893 A1 | 12/2021 | Woo et al. | |

FOREIGN PATENT DOCUMENTS

| | | |
|---|---|---|
| KR | 1020160123201 | 10/2016 |
| KR | 1020160123620 | 10/2016 |
| KR | 10-2017-0048007 | 5/2017 |
| WO | 2016035899 | 3/2016 |

OTHER PUBLICATIONS

European Patent Office Application Serial No. 19950988.6, Search Report dated Jul. 7, 2023, 11 pages.

Korean Intellectual Property Office Application No. 10-2022-7015711, Office Action dated May 20, 2024, 7 pages.

* cited by examiner

FIG. 6
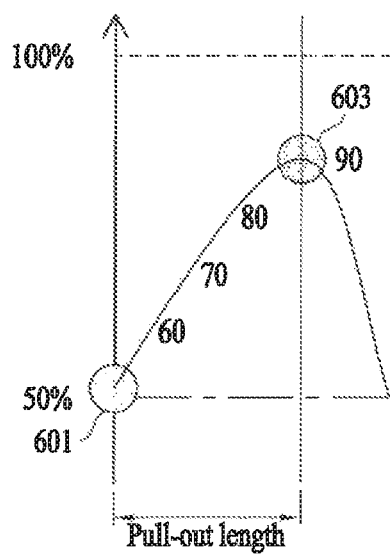
(a)
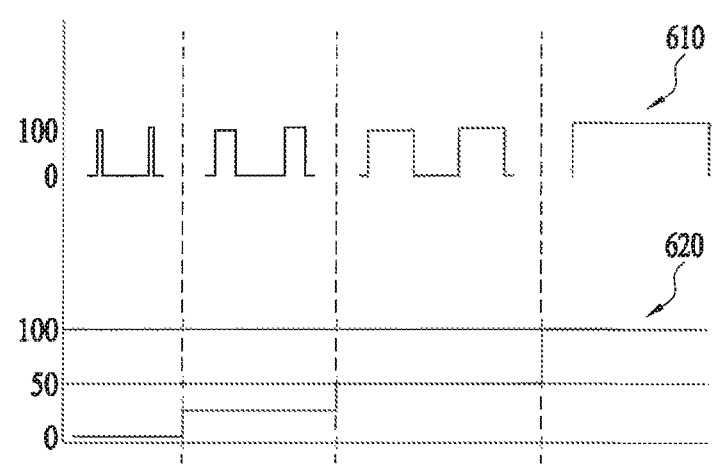
(b)

FIG. 12
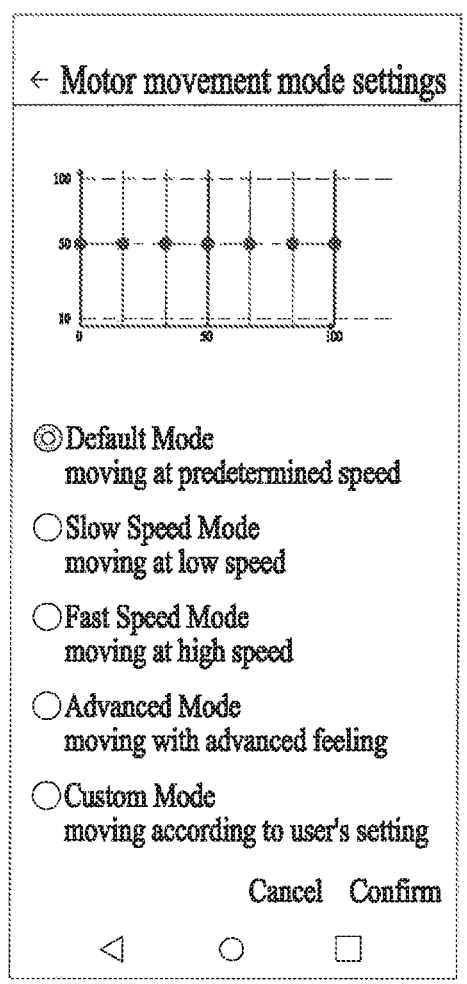
(a)
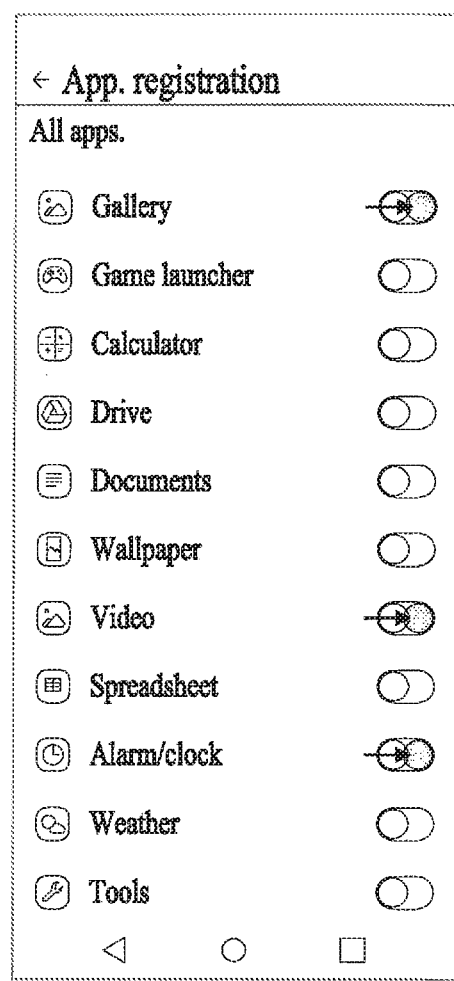
(b)

FIG. 13
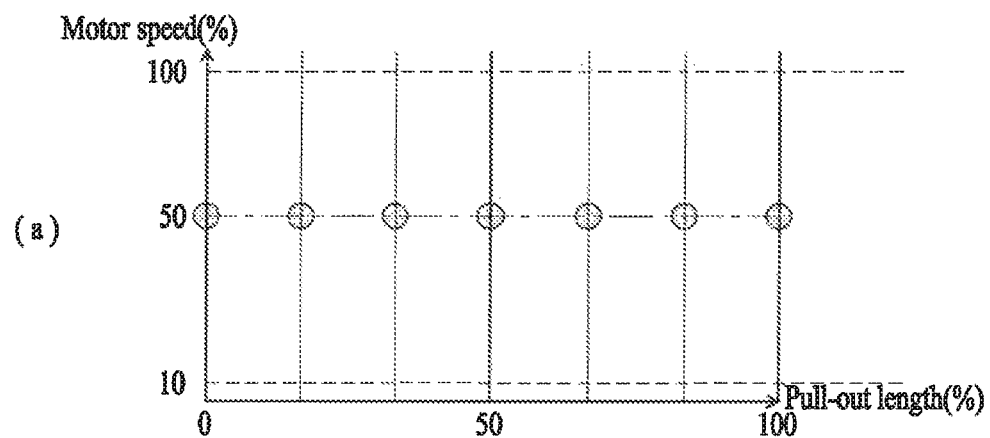
(a)
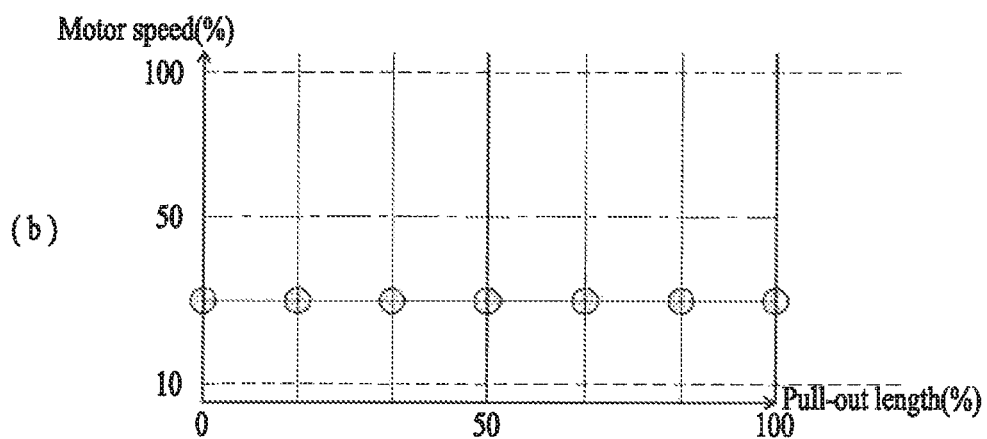
(b)
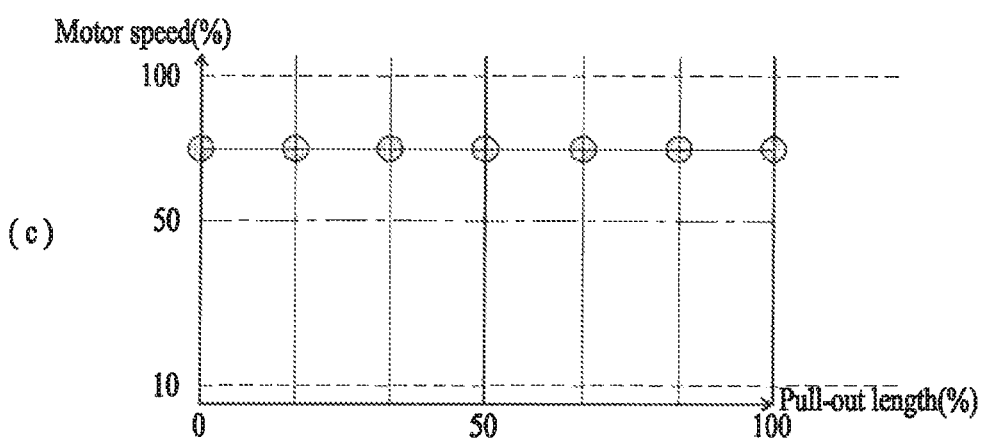
(c)

FIG. 15
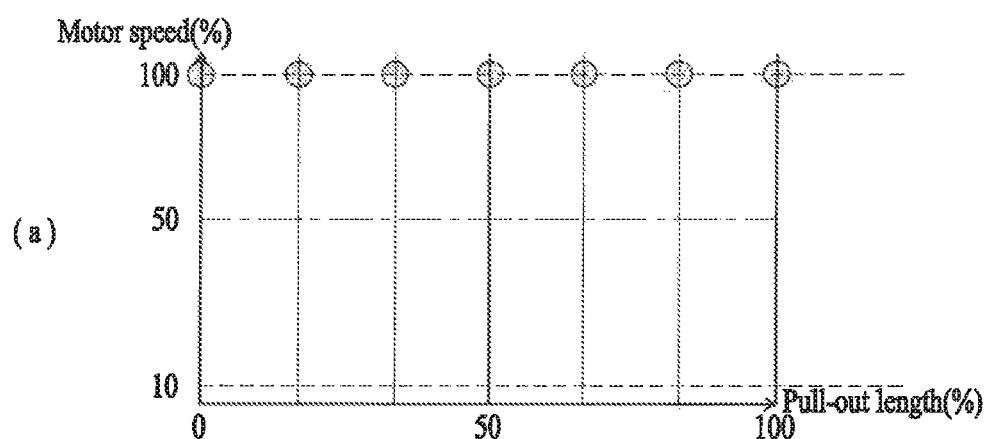
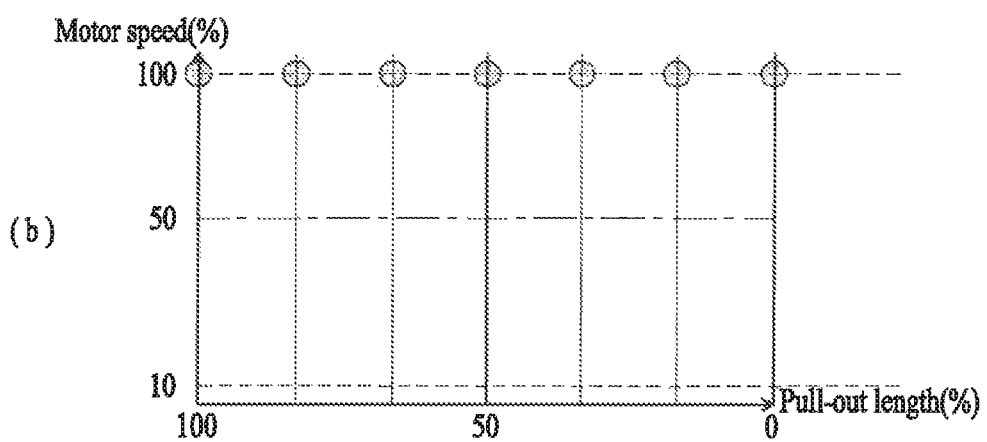

FIG. 18
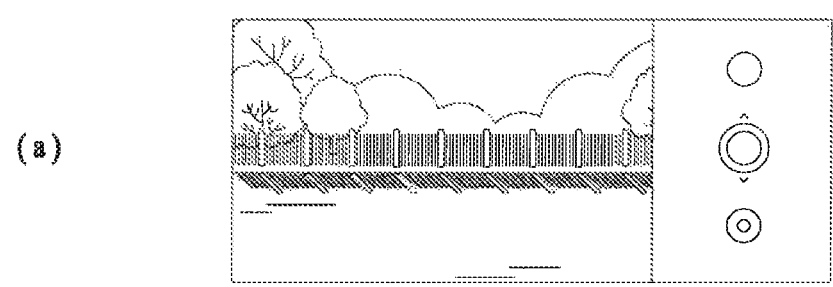
(a)
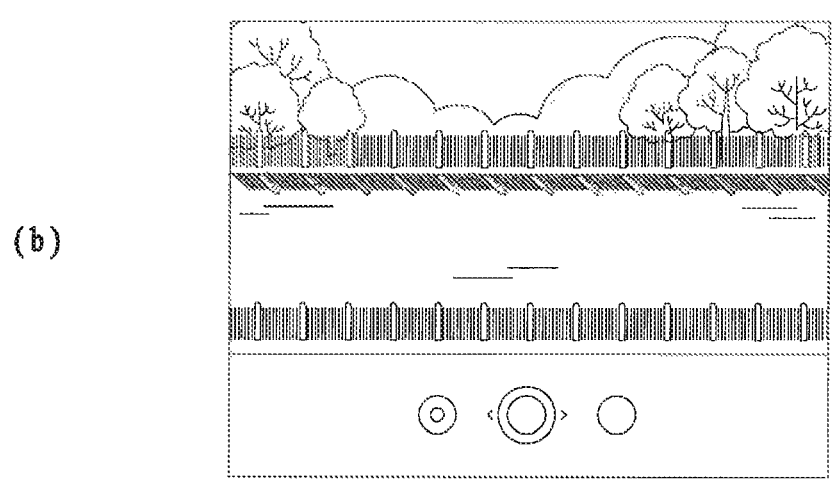
(b)
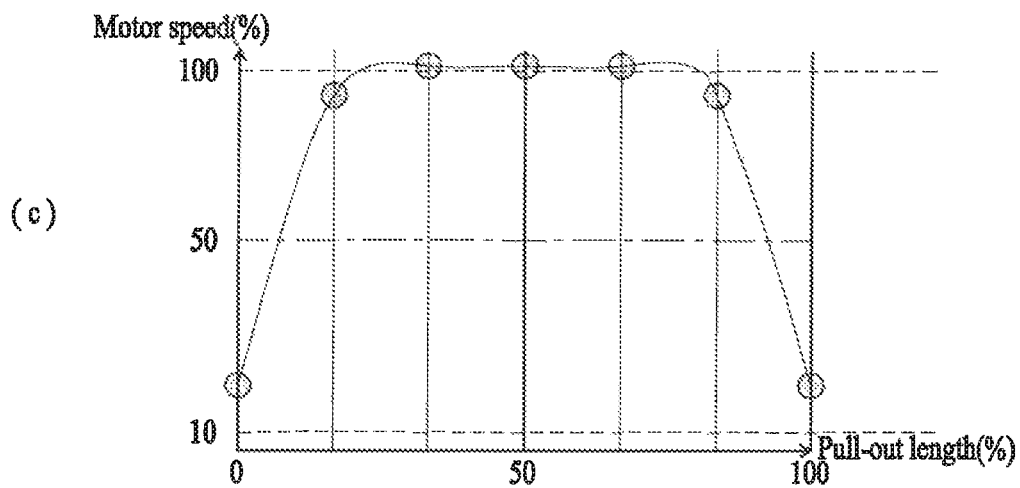
(c)

FIG. 19
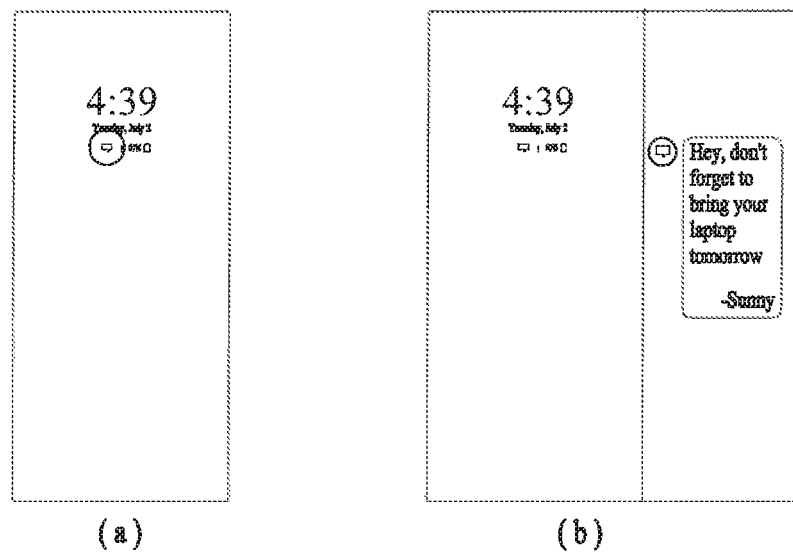
(a)    (b)
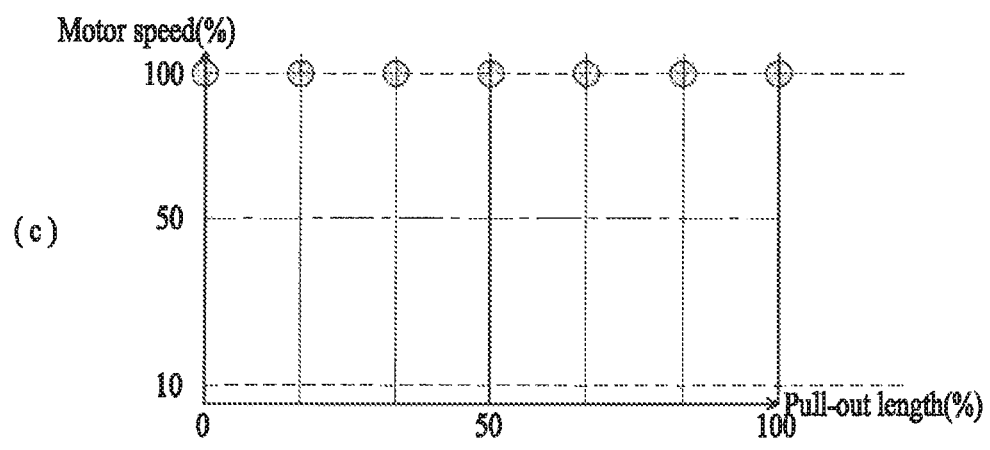
(c)
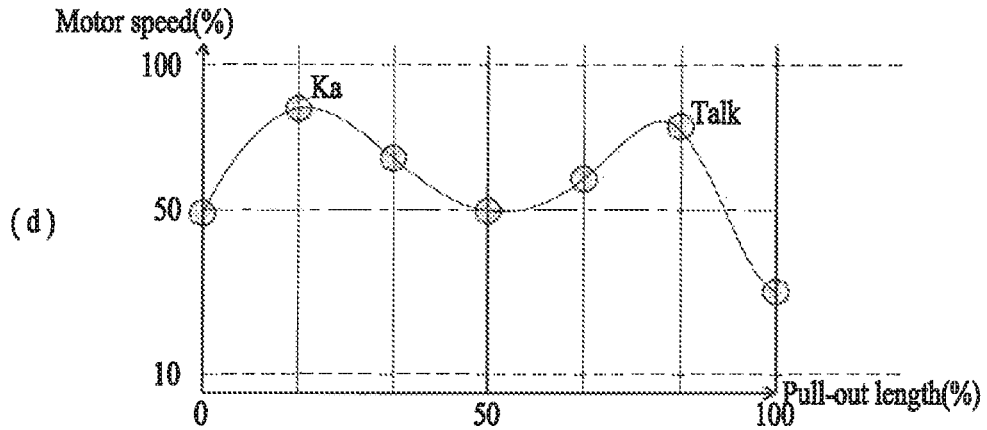
(d)

FIG. 21
(a)
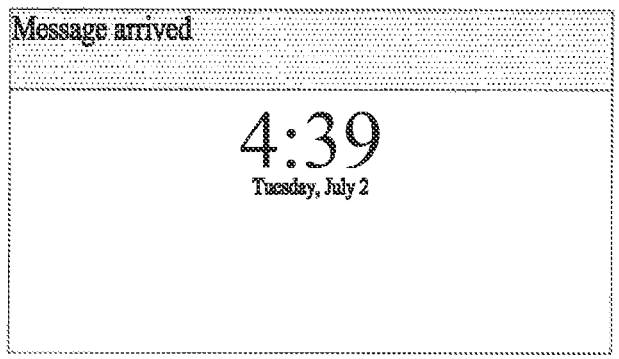
(b)

FIG. 22
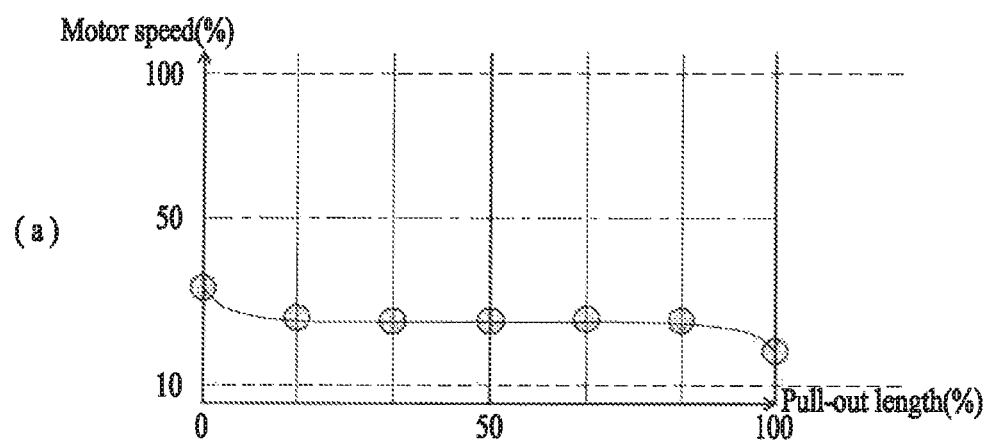
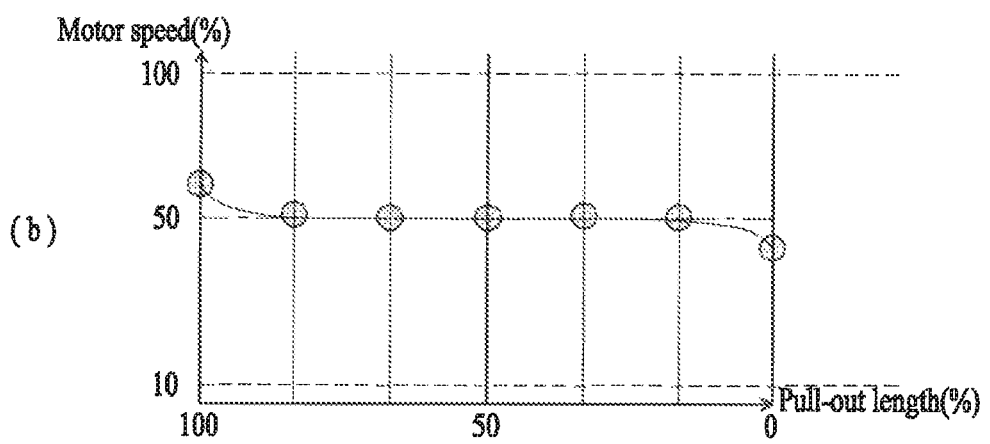

FIG. 24

FIG. 26
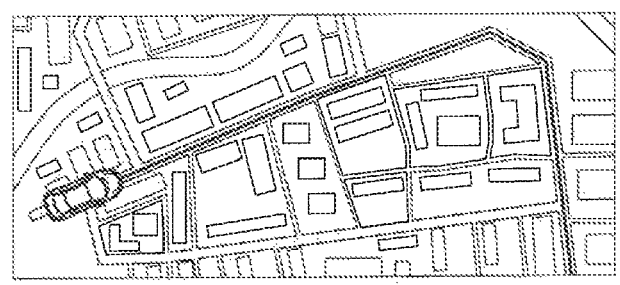
(a)
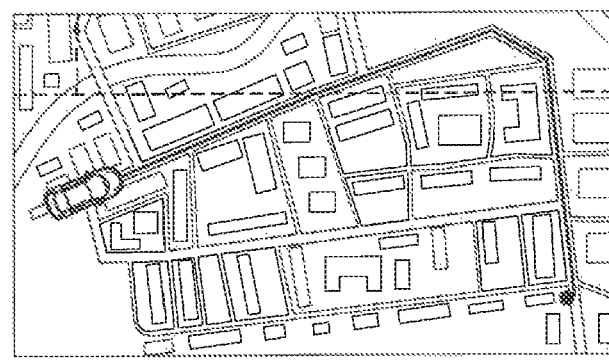
(b)
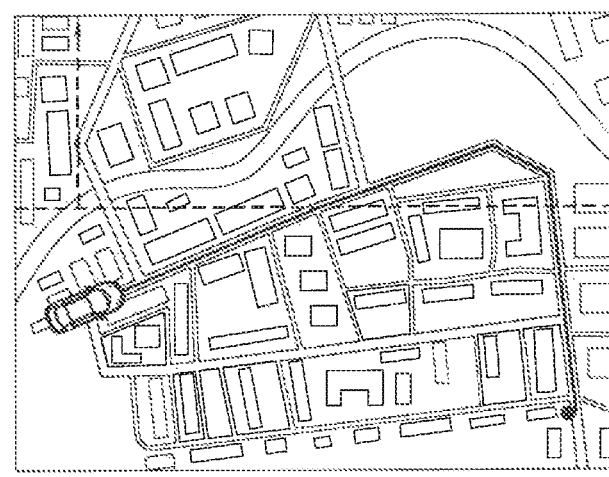
(c)

(a)　　　　　　　　(b)

ELECTRONIC DEVICE INCLUDING DISPLAY CHANGING IN SIZE AND CONTROL METHOD THEREFOR

CROSS-REFERENCE TO RELATED APPLICATIONS

This application is the National Stage filing under 35 U.S.C. 371 of International Application No. PCT/KR2019/014275, filed on Oct. 28, 2019, the contents of which are all incorporated by reference herein in their entirety.

TECHNICAL FIELD

This disclosure relates to an electronic device that changes a size of a display based on an operation pattern related to event information associated with a size change of the display and a control method thereof.

BACKGROUND ART

Advances in network technologies and expansions of infrastructures have enabled an electronic device with a display to perform various and professional tasks. Accordingly, there has been an increasing desire for a display that displays content on a large screen.

However, a display providing a large screen may not be suitable for carrying because the size increases in proportion to the size of the screen.

To solve this, there can be considered a method to change a size of a display as necessary by applying a foldable or rollable display having a sufficient elasticity to the electronic device. For example, a portion of a display may be rolled up to a rear side or inside of a mobile terminal, and rolled out or moved as necessary such that an exposed area of the display increases.

As of yet, changing the size of the display is performed in a simple manner that the user directly applies a physical force to an electronic device to unfold the display, which may cause inconvenience. Therefore, there is a desire for a method to easily and efficiently control a size of a display.

DISCLOSURE OF INVENTION

Technical Goals

An aspect provides an electronic device that changes a size of a display based on event information associated with a size change of the display, thereby easily and efficiently changing the size of the display and improving usability and a control method thereof.

Technical goals of the present disclosure are not limited as mentioned above and, although not mentioned, may include goals that can be clearly understood by those skilled in the art to which the present disclosure pertains, from the following description.

Technical Solutions

According to an aspect, there is provided an electronic device including a motor, a flexible display disposed to be changed in a size to which the flexible display is exposed to one side in accordance with an operation of the motor, and a processor configured to control the display and the motor, wherein the processor is configured to identify event information associated with a change in a size of an exposed display, identify an operation pattern of the motor based on the event information, and change the size of the exposed display based on the identified operation pattern.

According to another aspect, there is also provided a method of controlling an electronic device including a motor and a flexible display disposed to be changed in a size to which the flexible display is exposed to one side in accordance with an operation of the motor, the method which includes identifying event information associated with a change in a size of an exposed display, identifying an operation pattern of the motor based on the event information, and changing the size of the exposed display based on the identified operation pattern.

Effects

According to example embodiments, it is possible to provide an electronic device that changes a size of a display based on event information associated with a size change of the display, thereby easily and efficiently changing the size of the display and improving usability and a control method thereof.

Effects are not limited to the aforementioned effects, and other effects not mentioned will be clearly understood by those skilled in the art from the description of the claims.

BRIEF DESCRIPTION OF DRAWINGS

FIG. 6 is a diagram illustrating a motor speed of an electronic device according to an example embodiment of the present disclosure.

FIG. 12 is a diagram illustrating an example of setting an operation pattern of a motor for each application installed in an electronic device according to an example embodiment of the present disclosure.

FIGS. 13 through 16 are diagrams illustrating examples of an operation pattern of a motor of an electronic device according to an example embodiment of the present disclosure.

FIG. 18 is a diagram illustrating an operation pattern of a motor when a camera application is executed in an electronic device according to an example embodiment of the present disclosure.

FIGS. 19 through 21 are diagrams illustrating an operation pattern of a motor when a message is received in an electronic device according to an example embodiment of the present disclosure.

FIGS. 22 through 25 are diagrams illustrating a plurality of operation patterns related to one event of an electronic device according to an example embodiment of the present disclosure.

FIG. 26 is a diagram illustrating an example of playing multimedia on an electronic device according to an example embodiment of the present disclosure.

BEST MODE FOR CARRYING OUT THE INVENTION

Figure 1:
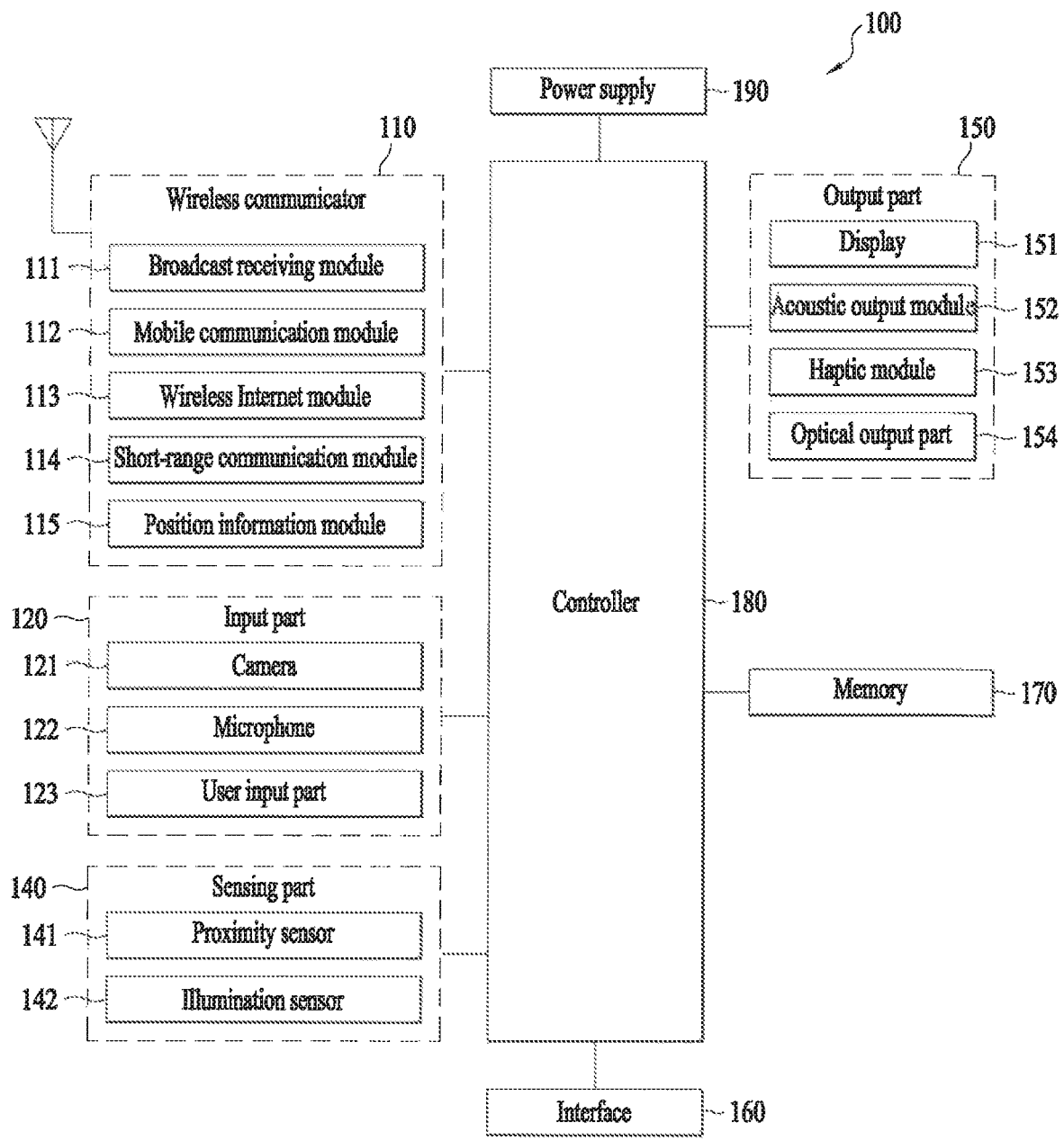
FIG. 1 is a block diagram illustrating an electronic device related to the present disclosure.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known arts will be omitted when it is deemed that such description will cause ambiguous interpretation of the present disclosure. In addition, the accompanying drawings are only for easy understanding of the embodiments disclosed in the present specification, and the technical ideas disclosed in the present specification are not limited by the accompanying drawings. Also, it should be understood to cover all modifications, equivalents, and alternatives falling within the spirit and scope of the present specification.

Although terms such as "first" and "second" may be used herein to describe various elements, these elements are not to be limited by these terms. Rather, these terms are only used to distinguish one element from another element.

When an element is described as being "connected to" or "coupled to" another element, it may be directly "connected to" or "coupled to" the other element, or there may be other elements intervening therebetween. In contrast, when an element is described as being "directly connected" or "directly coupled to" another element, there can be no other elements intervening therebetween.

The singular forms are intended to include the plural forms as well, unless the context clearly indicates otherwise.

In the present specification, it will be further understood that the terms "comprises" or "includes", when used herein, specify the presence of stated features, integers, steps, operations, elements, components, or combinations thereof, but do not preclude the presence or addition of one or more other features, integers, steps, operations, elements, components, or combinations thereof.

FIG. 1 is a block diagram illustrating an electronic device (or a mobile terminal) 100 related to an example embodiment of the present disclosure.

An electronic device 100 may include a wireless communication part 110, an input part 120, a sensing part 140, an outer part 150, an interface 160, a memory 170, a controller (or processor) 180, and a power supply 190. The components illustrated in FIG. 1 are not essential to implementing the electronic device, so the electronic device 100 described herein may have more or fewer components than those listed above.

Specifically, the wireless communication part 110 may include at least one module that enables wireless communication to be performed between the electronic device 100 and a wireless communication system, between the electronic device 100 and another electronic device 100, or between the electronic device 100 and an external server. The wireless communication part 110 may include one or more modules that connect the electronic device 100 to one or more networks.

The wireless communication part 110 may include at least one of a broadcast receiver 111, a mobile communication part 112, a wireless Internet part 113, a short-range communication part 114, and a position information part 115.

Referring to the wireless communication part 110, the broadcast receiver 111 of the wireless communication part 110 may receive a broadcast signal and/or broadcast related information from an external broadcast management server through a broadcast channel. The broadcast channel may include a satellite channel and a terrestrial channel. Two or more broadcast receivers may be provided to the mobile terminal 100 for simultaneous broadcast reception or broadcast channel switching for at least two broadcast channels.

The mobile communication part 112 may transmit and receive a wireless signal to and from at least one of a base station, an external terminal, and a server on a mobile communication network constructed based on technical standards for mobile communication or communication schemes such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like, for example.

The wireless signal may include various types of data based on transmission and reception of a voice call signal, a video call signal, or a text/multimedia message.

The wireless Internet part 113 may refer to a module for wireless Internet access, and may be embedded or disposed external to the electronic device 100. The wireless Internet part 113 may be adapted to transmit or receive the wireless signal in the communication network based on wireless Internet technologies.

The wireless Internet technologies may be, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet part 113 may transmit and receive data based on at least one wireless Internet technology in a range including Internet technologies not listed above.

In view of that the wireless Internet access made by WiBro, HSDPA, HSUPA, GSM, CDMA, WCDMA, LTE, and LTE-A is based on a mobile communication network, the wireless Internet part 113 that performs the wireless Internet access through the mobile communication network may be understood as a kind of the mobile communication part 112.

The short-range communication part 114 may be for short-range communication, and may support the short-range communication using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, Wireless Universal Serial Bus (USB) technology. The short-range communication part 114 may use wireless area networks to support wireless communication between the electronic device 100 and a wireless communication system, wireless communication between the electronic device 100 and another electronic device 100, or wireless communication between the electronic device 100 and a network in which another mobile terminal (100 or external server). The wireless range networks may be wireless personal area networks.

The position information part 115 may be a module that acquires a position (or current position) of a mobile terminal. A representative example of the position information part 115 may be a global positioning system (GPS) mobile or a Wi-Fi module. The mobile terminal may use the GPS module to acquire a position of the mobile terminal using signals transmitted from a GPS satellite. The mobile terminal may use the Wi-Fi module to acquire a position of the mobile terminal based on information on a wireless access point (AP) that transmits or receives a wireless signal to or from the Wi-Fi module. As necessary, the position information part 115 may perform a certain function of other modules of the wireless communication part 110 to acquire data on the position of the mobile terminal, additionally or in substitution. The position information part 115 may be a module used to acquire a position (or current position) of the mobile terminal and is not limited as a module that directly calculates or acquires a position of the mobile terminal.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The camera 121 may process an image frame such as a stationary image or a moving image acquired by an image sensor in a video call mode or a capturing mode. The processed image frame may be displayed on the display 151 or stored in the memory 170. For example, the electronic device 100 may include a plurality of cameras 121. In this example, the cameras 121 may be arranged in a matrix structure. Through the cameras 121 arranged in the matrix structure, a plurality of pieces of image information having various angles and focal points may be input to the electronic device 100. Also, the plurality of cameras 121 may be arranged in a stereo structure to acquire left and right images for implementing a stereo image.

The microphone 122 may process an external acoustic signal into electrical voice data. The processed voice data may be variously used based on a function performed (or an application program executed) in the electronic device 100. In the microphone 122, various noise removal algorithms may be implemented to remove noise generated in a process of receiving external acoustic signals.

The user input part 123 may be to receive information from a user. When the information is input through the user input part 123, the controller 180 may control an operation of the electronic device 100 based on the input information. The user input part 123 may include a mechanical input means (or a mechanical key, for example, a button a dome switch, a jog wheel, and a jog switch on a front, rear, or side surface of the electronic device 100) and a touch input means. The touch input means may include a virtual key, a soft key, or a visual key displayed on a touch screen through a software process, or include a touch key in a portion other than the touch screen. The virtual key or the visual key may each be displayed in a variety of forms and be any one or in a combination of, for example, graphics, texts, icons, and videos.

The sensing part 140 may include one or more sensors to sense at least one of information in the mobile terminal, surrounding environment information of the mobile terminal, or user information. For example, the sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic device 100 and a user and simultaneously, provide an output interface between the electronic device 100 and the user.

The acoustic output part 152 may output audio data stored in the memory 170 or received from the wireless communication part 110 in, for example, a call signal reception, a call mode or a recording mode, a voice recognition mode, and a broadcast reception mode. The acoustic output part 152 may output an acoustic signal related to a function (for example, a call signal reception sound and a message reception sound) performed in the electronic device 100. For example, the acoustic output part 152 may include at least one of a receiver, a speaker, or a buzzer.

The haptic part 153 may generate various tactile effects to be experienced by a user. A vibration may be a representative example of the tactile effects generated by the haptic part 153. An intensity and a pattern of the vibration generated by the haptic part 153 may be determined based on a selection of a user or setting of the controller 180. For example, the haptic part 153 may output a combination of different vibrations or output different vibrations in sequence.

The optical output part 154 may output a signal to announce an event occurrence using light of a light source of the electronic device 100. An event occurring in the electronic device 100 may be, for example, message reception, a call signal reception, missed call, alarm, schedule notification, e-mail reception, and application-based information reception.

The interface 160 may function as a passage to various types of external devices connected to the electronic device 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic device 100 may perform an appropriate control associated with the connected external device.

The memory 170 may store data supporting various functions of the electronic device 100. The memory 170 may store application programs (or applications) run in the electronic device 100, data for operation of the electronic device 100, and instructions. At least a portion of the application programs may be downloaded from an external server through wireless communication. Also, at least a portion of the application programs may exist in the electronic device 100 for a basic function (for example, call forwarding and outgoing function and message receiving and outgoing function) of the electronic device 100 from the time of manufacture. The application program may be stored in the memory 170, installed in the electronic device 100, and run by the controller 180 to perform an operation (or function) of the mobile terminal.

The controller 180 may generally control an overall operation of the electronic device 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the electronic device 100.

The power supply 190 may supply power to each component included in the electronic device 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

The electronic device 100 may be in a bar shape but not limited thereto. The electronic device 100 may have various shapes within the scope of not contradicting features of the present disclosure.

In the present disclosure, the electronic device 100 may refer to a mobile terminal obtained by applying a flexible display to the above-described mobile terminal. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic device 100 may include a deformation detection means that detects a deformation of the flexible display. The deformation detection means may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection means, the controller 180 may change information displayed on the flexible display or generate a control signal for controlling functions of the electronic device 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise state.

Figure 2:
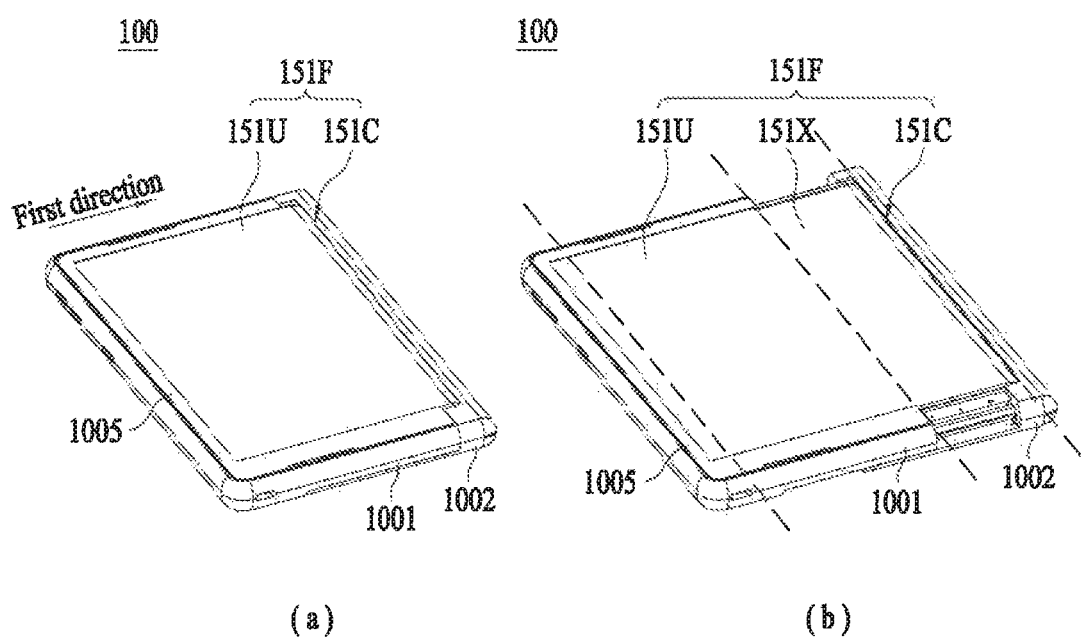
FIG. 2 illustrates front perspective views obtained before and after an expansion of a display of an electronic device according to an example embodiment of the present disclosure.
Figure 3:
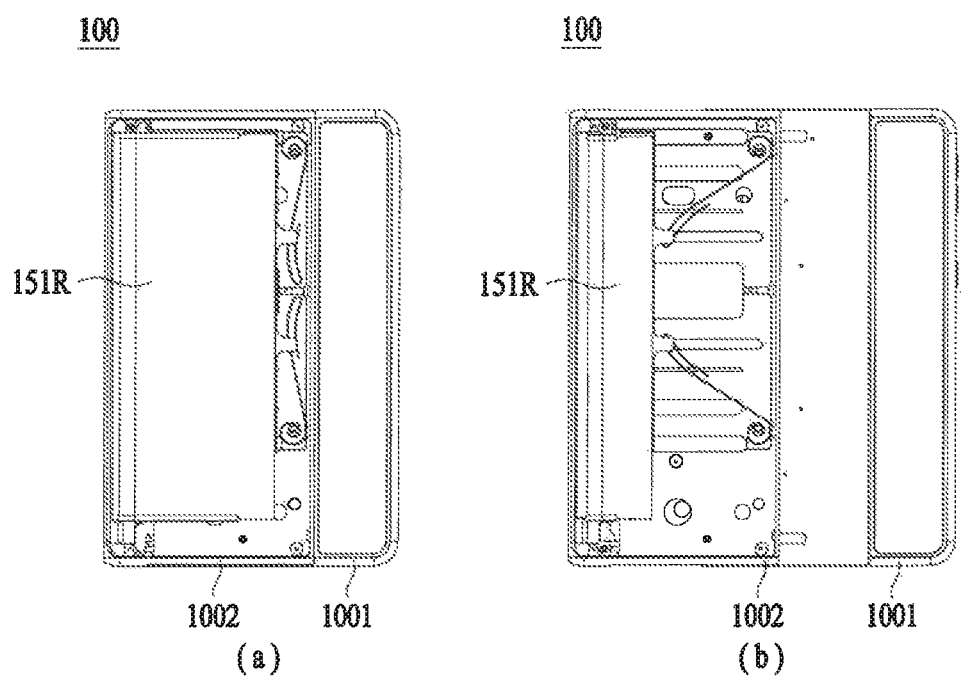
FIG. 3 illustrates rear views obtained before and after an expansion of a display of an electronic device according to an example embodiment of the present disclosure.

FIG. 2 is a front perspective view illustrating a display 151 of an electronic device 100 before and after an expansion of the display 151 according to an example embodiment of the present disclosure and FIG. 3 is a rear view thereof.

The display 151 may have one side fixed at a front surface area based on the electronic device 100. The display 151 may be wound at a first directional edge, so as to be provided over a back surface. A front surface area 151F of the display 151 may be expandable. In this example, a rear surface area 151R of the display 151 may be reduced. Conversely, when the front surface area 151F of the display 151 is reduced, the rear surface area 151R of the display 151 may be expanded.

A direction in which the front surface area 151F of the display 151 is expanded may be defined as a first direction. In this case, as the front surface area 151F is expanded, a winding area 151C of the display 151 may move in the first direction. Also, as the front surface area 151F of the display 151 is reduced, the wound area 210 of the display 151 may move in a direction opposite to the first direction.

To guide and support the expanded and reduced display 151, a frame supporting the display 151 may also be expanded and reduced accordingly. The frame may include a first frame 1001 and a second frame 1002 that slidably moves in the first direction relative to the first frame 1001.

In the front surface area 151F of the display 151, an area constantly maintained irrespective of an expansion and a reduction may be defined as a fixed area 151U. Also, an area selectively exposed on the front surface in accordance with the expansion and the reduction may be defined as a variable area 151X. Based on a state in which the front surface area 151F of the display 151 is expanded, the fixed area 151U of the display 151 may be located in the first frame 1001 and the variable area 151X of the display 151 may be located in the second frame 1002.

When the second frame 1002 slides in the first direction and extends from the first frame 1001, the front surface area 151F of the display 151 may be expanded, so that the fixed area 151U and the variable area 151X are exposed on the front surface. When the second frame 1002 slides in the direction opposite to the first direction and contracted from the first frame 1001, the front surface area 151F of the display 151 may be reduced, so that only the fixed area 151U remains.

A rear surface area 151R of the display 151 may be exposed on a rear surface of the second frame 1002. The display rear surface area 151R may be covered by a light-transmitting rear window to be viewable externally.

The display front surface area 151F may be exposed on the front surface without using a separate window. In some cases, a deco frame 1005 may cover a boundary area of the display front surface area 151F and the first frame 1001 to prevent an inflow of foreign material and cover a bezel area of the electronic device 100 to improve a user's screen visibility.

An electronic device part may be formed in an inner space formed by an appearance structure such as the first frame 1001 and the second frame 1002. Electronic components such as a battery 191 for driving the electronic device 100 may be mounted on a main-PCB so as to be included in the electronic device part. An electronic component such as an inner antenna module may be provided directly in the electronic device part, not through the main-PCB.

In the example embodiment, the electronic device 100 may include a motor (or driver) to expand the display 151. The electronic device 100 may adjust a moving direction of the winding area 151C of the display 151 using the motor, thereby changing the size of the display 151.

Figure 4:
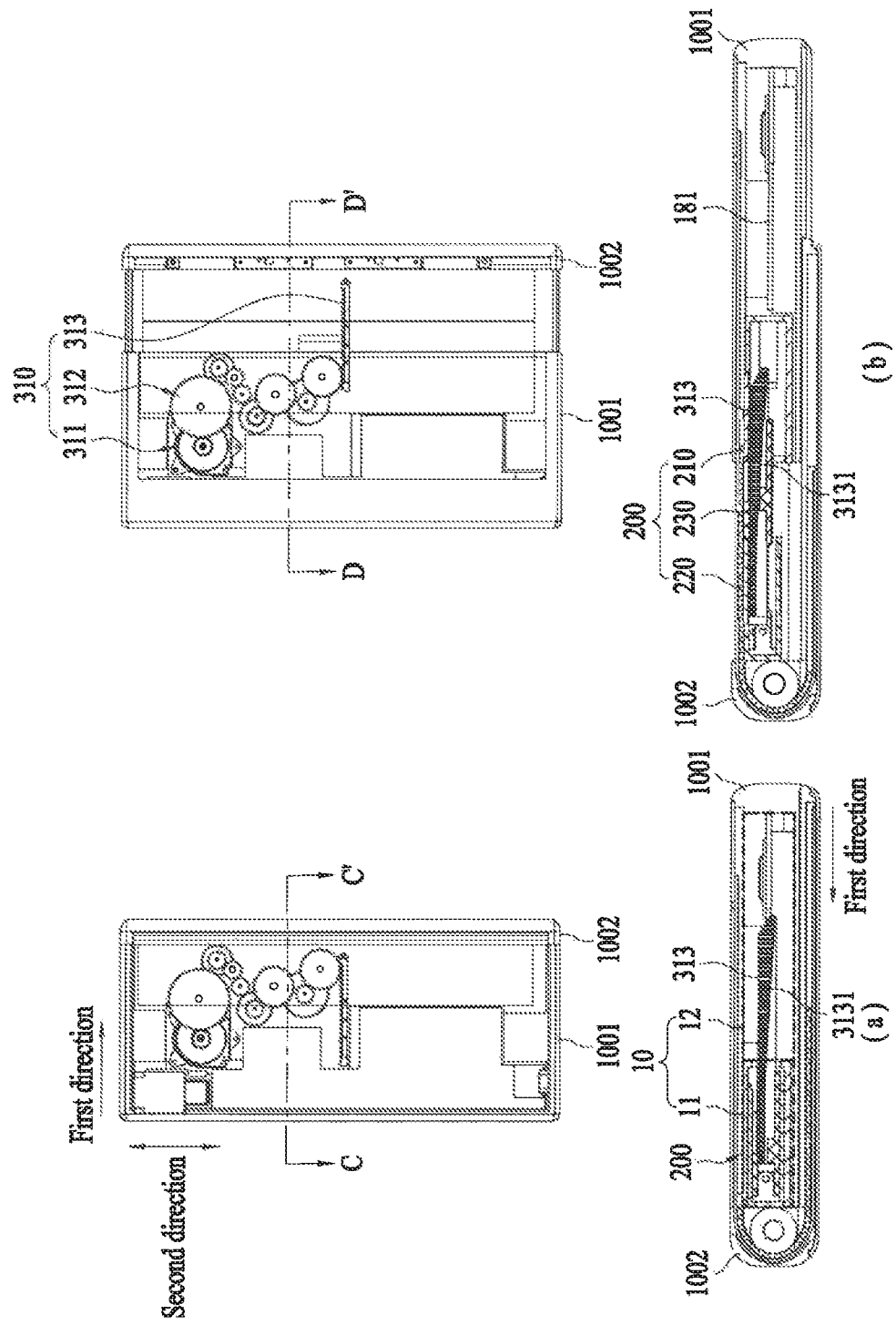
FIG. 4 illustrates perspective views and cross-sectional views obtained before and after an expansion of a display of an electronic device according to another example embodiment of the present disclosure.

(a) of FIG. 4 illustrates a perspective view and a cross-sectional view taken along a line C-C' as viewed from a rear surface of an electronic device before an expansion of a display. (b) of FIG. 4 illustrates a perspective view and a cross-sectional view taken along a line D-D' as viewed from the rear surface of the electronic device after the expansion of the display.

An expansion support 200 may be expanded or contracted by a driver 310. The driver 310 may be provided in a form of an actuator including a motor 311 and driven based on an expansion signal or a contraction signal generated by a controller. The expansion signal may correspond to an expansion of the display front surface area 151F and the contraction signal may correspond to a reduction of the display front surface area 151F.

The driver 310 may provide force for extending the expansion support 200 in a first direction which is a withdraw direction of a sub-member 220.

The driver 310 may include the driving motor 311 that rotates by receiving power, a gear part 312 that transfers a rotatory force of the driving motor 311 to an appropriate position at an appropriate gear ratio, and a gear rack 313 that converts a rotational motion of the gear part 312 into a straight line motion.

The driving motor 311 and the gear part 312 of which positions are fixed may be fixed to a side of the first frame 1001, that is, an invariable member in the electronic device 100. The gear rack 313 may be fixed to a side of the second frame 1002, that is, a variable member.

Specifically, the driving motor 311 and the gear part 312 may be fixed to the first frame 1001 through a main-PCB 181. A main member 210 of the expansion support 200 may be fixed to the first frame 1001 through a middle frame 1004. The gear rack 313 may be fixed to the sub-member 220 of the expansion support 200. The gear rack 313 may be driven by the driver 310 to be moved, and simultaneously, the sub-member 220 moves such that the expansion support 200 extends or contracts.

Meanwhile, the sub-member 220 of the expansion support 200 may be fixed to the second frame 1002, so that a driving force of the driver 310 expands or reduces the second frame 1002, furthermore, the display front surface area 151F.

To move the sub-member 220 and the second frame 1002 in the first direction, the gear rack 313 may extend in the first direction. Specifically, the gear rack 313 may be located around a center of the expansion support 200 based on a second direction, so as to evenly transfer a force to the sub-member 220.

Also, the driving motor 311 and the gear part 312 may use a portion of an inner space of the expansion support 200 to maximally secure a space for the electronic device part.

The gear rack 313 may form an inclination 3131 in an area corresponding to a curved portion 2411, 2511 of a guide part. The sub-member 220 may move upwardly in terms of thickness in comparison to the main member 210 due to a shape of the curved portion 2411, 2511 in a withdraw process. Due to such movement, a positional change between the gear rack 313 and a gear may occur in a thickness direction. The gear rack 313 fixedly provided to the sub-member 220 may form the inclination 3131 descending from the area corresponding to the curved portion 2411, 2511 such that a stable contact is to be maintained even when the gear part 312 descends.

Figure 5:
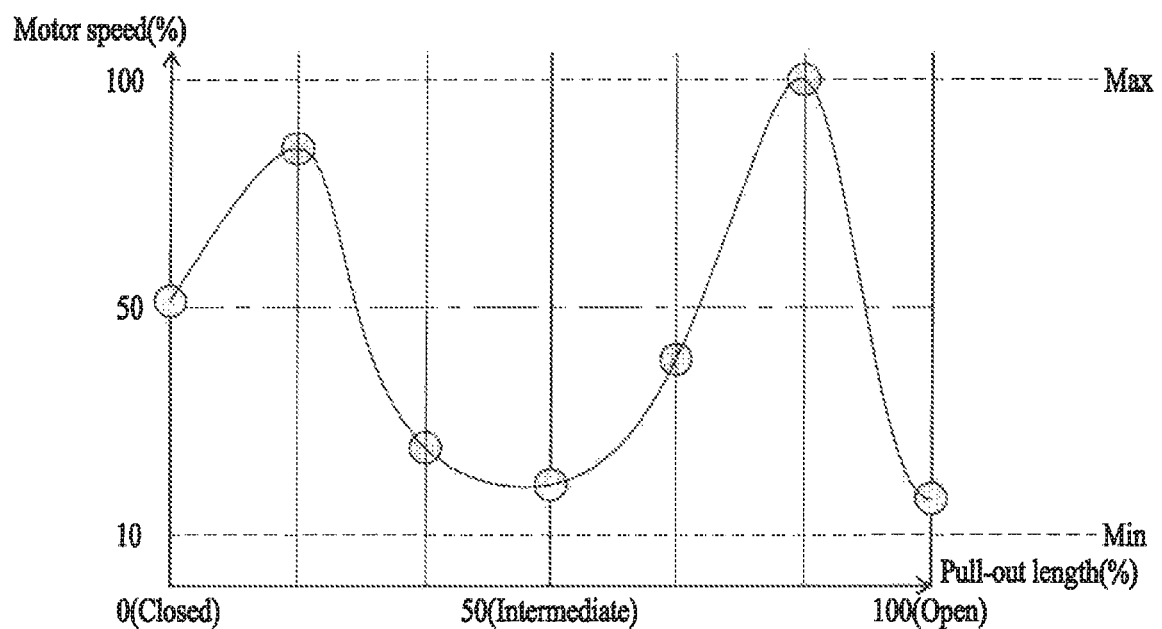
FIG. 5 is a diagram illustrating an operation pattern of a motor of an electronic device according to an example embodiment of the present disclosure.

FIG. 5 is a diagram illustrating an operation pattern of a motor of an electronic device according to an example embodiment of the present disclosure. Specifically, FIG. 5 conceptually illustrates an operation pattern obtained when a motor (e.g., the driver 310 of FIG. 4) is driven at a driving speed corresponding to a size of a display exposed.

Referring to FIG. 5, an operation pattern of the motor may be defined based on a motor speed (or a motor driving speed) according to a pull-out length of the display. The pull-out length of the display may be the size of the display exposed (or extended) based on a default state of the display.

The pull-out length may be expressed by setting a default state, that is, a basic state before extension as 0%, and a state in which the display is maximally extended as 100%. The motor speed may be expressed by setting a state in which the motor is stopped as 0% and a state in which a display expanding speed is maximum as 100%. However, it is merely an example, and the present disclosure is not limited thereto. For example, the pull-out length may be expressed in units of millimeters (mm) or the motor speed may be expressed in units of pulse width modulation (pwm).

As illustrated in FIG. 5, in relation to the operation pattern, the pull-out length of the display may be divided into at least one section (six sections in FIG. 5). The motor speed may be set for each section (or for each reference point for each section). For example, the motor speed may be set with respect to a reference line dividing each section as illustrated.

More specifically, for example, the motor speed may be set to 50 when the pull-out length is 0, the motor speed may be set to 80 when the pull-out length is 17, the motor speed may be set to 30 when the pull-out length is 33, and the motor speed may be set to 20 when the pull-out length is 50.

In this case, a range between the set values of the motor speed may be determined based on a predetermined interpolation method. The predetermined interpolation method may include, for example, spline interpolation.

The spline interpolation may indicate, for example, interpolating a motor speed between set values of the motor speed by generating a spline curve using a spline (e.g., a Hermite spline and a cubic spline) that passes a control point (e.g., a point of a set motor speed) and mapping a value on the spline curve to the motor speed based on a resolution of the motor. A related example is described with reference to FIG. 6.

In the example embodiment, a range of settable motor speeds may be specified. As illustrated, for example, a range of a settable motor speed may be specified in a range having 10 as a minimum value and 100 as a maximum value. If the minimum value of the motor speed range exceeds 0, the motor may not stay in a stationary state. Thus, the size of the display may be changed more smoothly without interruption.

Meanwhile, it is apparent that the case in which the range of the motor speed is specified is merely an example and the range may also not be specified.

FIG. 6 is a diagram illustrating a motor speed of an electronic device according to an example embodiment of the present disclosure. Specifically, FIG. 6 illustrates a method of interpolating values between motor speeds set in relation to an operation pattern of a motor and controlling the motor speed.

Referring to (a) of FIG. 6, a motor speed may be set to 50 at a first pull-out length (e.g., 0) as shown by a first point 601 and the motor speed may be set to 80 at a second pull-out length (e.g., 17) as shown by a second point 603. The first point 601 and the second point 603 may be positions on a reference line for a pull-out length section.

In the example embodiment, when the first point 601 and the second point 603 are set, values between the first point 601 and the second point 603 may be determined based on the spline interpolation.

Specifically, values between the first point 601 and the second point 603 may be determined through interpolation of a motor speed between set values of the motor speed after generating a spline curve using a spline (e.g., a Hermite spline and a cubic spline) that passes the first point 601 and the second point 603 and mapping a value on the spline curve to the motor speed based on a resolution of the motor.

Meanwhile, the spline may be interpolating a value of an omitted part by changing a factor of a function to a ratio within an interval using a derivative (e.g., first derivative, second derivative) and normalization. As the spline used herein, various known splines may be used.

In some cases, the motor may include a sensor (e.g., optical sensor) that senses a pull-out length of a display. In such cases, the values between the first point 601 and the second point 603 may be determined by identifying a number of counts of the sensor per pull-out distance and determining a motor speed for each count number range of the sensor.

For example, when the count of the sensor per pull-out length (e.g., 10) from the first point 601 to the second point 603 is 1000, an unsettled motor speed section (e.g., 50 through 90) corresponding to a section corresponding to the pull-out distance (e.g., 10) may be divided by 1000. In this example, a motor speed of a section between 0 and 250 may be set to 60, a motor speed of a section between 251 and 500 may be set to 70, and a motor speed of a section between 501 and 750 may be set to 80. However, it is merely an example, and the motor speed may vary for each count value of the sensor, that is, 1000.

In the example embodiment, a control of the motor speed may be implemented through a control of pwm, more specifically, a control of pwm duty cycle. The pwm duty cycle may indicate a ratio of a total duration of a pulse to a total time within a predetermined period of time during which a continuous operation is performed. Through the control of the pwm duty cycle, a voltage applied to the motor may be adjusted and accordingly, the motor speed may be controlled.

(b) of FIG. 6 illustrates a pwm duty cycle used when a motor speed is controlled based on pwm.

A first graph 610 sequentially shows a pwm duty cycle for each motor speed when the motor speed is 5, 30, 50, and 100. As illustrated, when the motor speed is 5, a proportion of a value against 100 in the pwm duty cycle may be 5%. In addition, when the motor speed is 30, a proportion of a value against 100 in the pwm duty cycle may be 30%. Also, when the motor speed is 50, a proportion of a value against 100 in the pwm duty cycle may be 50%. Further, when the motor speed is 100, a proportion of a value against 100 in the pwm duty cycle may be 100%.

A second graph 620 shows a mean value for each pwm duty cycle of the first graph 610.

Meanwhile, in the pwm duty cycle, a value '100' may indicate a case in which a voltage is applied to the motor, and a value '0' may indicate a case in which a voltage is not applied.

Figure 7:
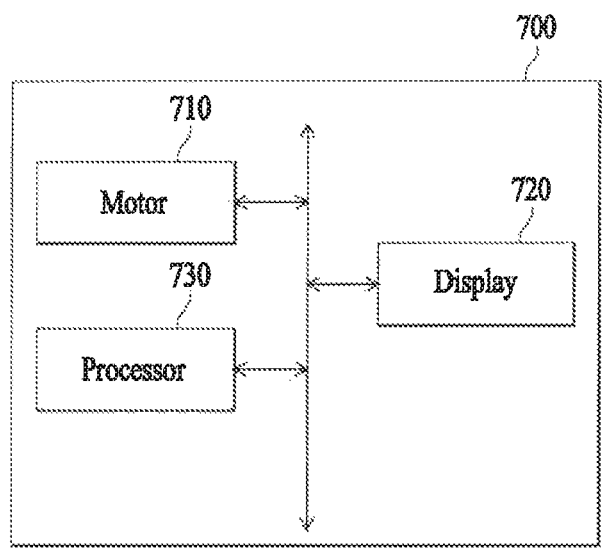
FIG. 7 is a functional block diagram illustrating an electronic device according to an example embodiment of the present disclosure.

FIG. 7 is a functional block diagram illustrating an electronic device according to an example embodiment of the present disclosure. Hereinafter, a component (e.g., motor, display, processor) included in an electronic device may indicate a unit that processes at least one function or operation, and may be implemented as hardware or software, or a combination of hardware and software.

Referring to FIG. 7, an electronic device 700 may include a motor 710, a display 720, and a processor 730. In some cases, the motor 710 may be implemented by a computing device including a microprocessor, and this may be the same for the display 720 and the processor 730 as described later.

The motor 710 may be driven by a display size change signal (e.g., size expansion signal, size reduction signal) generated by the processor 730, which will be described later. In this case, the size expansion signal may correspond to an expansion of the display 720 exposed, and the size reduction signal may correspond to a reduction of the display 720 exposed.

Specifically, the motor 710 may be connected to the display 720, and change the size of the display 720 by applying a force to the display 720 in response to the motor 710 being driven.

A speed at which the motor 710 is driven (hereinafter, referred to as a "motor speed") may be changed according to the control of the processor 730. Based on the motor speed, an operation pattern of the motor in relation to a change in motor speed may be defined. The operation pattern of the motor 710 may be determined in advance, and an aspect or designation method of the operation pattern will be described later.

The display 720 may be a flexible display disposed so that a size of a portion exposed to one side is changed based on an operation of the motor. For example, as described with reference to FIGS. 2 through 4, the display 720 may be changed in size while the display 720 is rolled up into the electronic device 700. However, the present example is not to be taken as being limited thereto. The size may be changed in various ways.

Depending on an implementation method, one side at which a size of an exposed portion of the display 720 is changed may be one of a plurality of sides constituting the display 720. For example, when the display 720 is in a rectangular shape, one of four sides may be a side at which the size of the exposed portion is changed.

The display 720 may include a screen. The screen may be an area in which contents are displayed, and may be provided at a front side of the display 720, for example. The screen may be changed in response to the size of the exposed portion of the display 720 being changed. For example, the screen may expand as the size of the exposed portion of the display 720 increases and may be reduced as the size of the exposed portion of the display 720 is reduced. However, the present disclosure is not limited to this example.

The processor 730 may identify event information associated with the size change of the exposed display 720. Specifically, the processor 730 may identify (receive or obtain) information about an event for which the size change of the exposed portion of the display 720 is required.

The event information may be information associated with at least one of, for example, execution of a predetermined application, execution of an application included in a predetermined category, reception of a message including a predetermined keyword, execution of predetermined multimedia, a number of applications executed in parallel, reception of an input to a predetermined area of a screen, a size change of multimedia displayed on a display, a number of texts displayed on the display, a text size, a user's pupil movement acquired by a sensor, message checking, non-checking of a message, playback of predetermined sound, and a predetermined user input. Such an event may be predefined by an input of a user or basic setting of the electronic device 700. In addition, the predetermined user input may include an input related to setting of an operation pattern of the motor, for example, an input of a user setting an operation pattern of a motor through a setting window.

The identification of the event information may be performed, for example, based on an acquisition (e.g., reception of information indicating that an input to a predetermined area of a screen is acquired) from other components of the electronic device 700 while the processor 730 controls the overall operation of the electronic device 700, and may also be performed based on direct identification (e.g., detection of execution of a predetermined application) by the processor 730.

In the example embodiment, when the event information is identified, the processor 730 may identify a state of the electronic device 700. The state of the electronic device 700 may include at least one of, for example, a moving state of the electronic device 700, an ambient state of the electronic device 700, and a fixed size state of the electronic device 700. Meanwhile, the identification of the state of the electronic device 700 may be performed based on various sensors, and it is apparent for those skilled in the art, so a description of such will be omitted.

In this case, the processor 730 may identify the below-described operation pattern based on the state of the electronic device 700 and determine whether to drive the motor.

As an example, when it is verified that the electronic device 700 is in the moving state, the processor 730 may suspend an operation related to changing the size of the display 720 exposed. When it is verified that the electronic device 700 is in a stationary state, the processor 730 may perform the operation related to changing the size of the display 720 exposed.

As another example, when it is verified that another object is present in a predetermined radius from the electronic device 700, the processor 730 may suspend the operation related to changing the size of the display 720 exposed. When it is verified that another object is absent in a predetermined radius from the electronic device 700, the processor 730 may perform the operation related to changing the size of the display 720 exposed.

As still another example, when it is verified that the electronic device 700 is in the fixed size state, the processor 730 may suspend the operation related to changing the size of the display 720 exposed. When it is verified that the electronic device 700 is in the fixed size state, the processor 730 may perform the operation related to changing the size of the display 720 exposed.

Hereinafter, the operation of the processor 730 related to changing the size of the display 720 exposed will be described in greater detail.

The processor 730 may identify an operation pattern of the motor 710 based on the event information. The operation pattern may be designated for each event in advance. When the event information is identified based on the designation, the processor 730 may identify the operation pattern designated for the event information.

For example, the operation pattern may be designated for each application installed in the electronic device 700 or designated for each category including an application. At this time, a first operation pattern may be designated for a message application. In this case, in response to event information indicating execution of the message application being identified, the processor 730 may identify the first operation pattern designated for the message application.

A related example of a case in which an operation pattern is designated for each application will be described with reference to FIG. 12, and a related example of a case in which an operation pattern is designated for each category will be described with reference to FIG. 17.

In the example embodiment, the operation pattern may be designated in advance based on a screen size (e.g., 5 inches) or screen aspect ratio (e.g., 4:3). For example, the first operation pattern may be designated for a screen of the first size (or first aspect ratio), and a second operation pattern may be designated for a screen of the second size (or first aspect ratio). In this example, when the event information is identified, the processor 730 may identify the screen size corresponding to the event information, thereby identifying the operation pattern of the motor 710 to adjust the display 720.

In the example embodiment, the operation pattern may be determined by a user. Specifically, the processor 730 may determine the operation pattern to correspond to a user input that indicates a speed of the motor 710 based on a length of the display 720 which is changed in response to the display 720 being exposed. At this time, the user input may include information on at least one section based on a range of the length. Specifically, for example, the user input may be an input of setting the speed of the motor for at least one section in association with the exposure (or the pull-out length) of the display 720 like the first point 601 or the second point 603 of FIG. 6.

In some cases, the operation pattern may be determined based on the input of the user and spline interpolation. For example, when a user input indicating the speed of the motor 710 for each of a first length and a second length of the display 720 is applied, the processor 730 may determine an operation pattern greater than or equal to the first length and less than or equal to the second length by determining the speed of the motor 710 for the first length to the second length based on the spline interpolation.

The operation pattern may have various types. As an example, the operation pattern may be a pattern that all sections associated with the exposure of the display 720 have the same motor speed. As another example, the operation pattern may include an operation pattern that a motor driving speed is changed at least once while the exposed display 720 is changed in size. An example of the operation pattern will be described in detail with reference to FIG. 13 or 16.

The processor 730 may change the size of the display 720 using the identified operation pattern. The processor 730 may identify motor speed information corresponding to the identified operation pattern and drive the motor based on the motor speed information, thereby changing an exposure size of one side of the display 720.

Specifically, the processor 730 may control the motor speed for each length of the display 720 as the identified operation pattern appears. Through this, a speed, intensity, and aspect of an operation of expanding the display 720 may be controlled.

In the example embodiment, when the event information includes information on playback of the predetermined multimedia, the processor 730 may identify the size of the screen corresponding to the predetermined multimedia. The processor 730 may identify the size of the display 720 exposed to correspond to the identified size of the screen and control the motor 710 to change the size of the exposed display 720 based on an operation pattern corresponding to the identified size. At this time, the size of the screen corresponding to the predetermined multimedia may be designated in advance for each type of the predetermined multimedia or for each size of the predetermined multimedia.

In the example embodiment, when the event information includes information on displaying a text, the processor 730 may identify a size of the screen corresponding to a number of texts. The processor 730 may identify the size of the display 720 exposed to correspond to the identified size of the screen and control the motor 710 to change the size of the exposed display 720 based on an operation pattern corresponding to the identified size. At this time, the size of the screen corresponding to the number of texts may be designated in advance for each number of texts (or range of numbers of texts).

In the example embodiment, when the event information includes information on the execution of the predetermined application, the processor 730 may identify a size of the screen corresponding to the predetermined application. The processor 730 may control the motor 710 to change the size of the exposed display 720 based on an operation pattern corresponding to the identified size. At this time, the size of the screen corresponding to the predetermined application may be designated in association with the predetermined application in advance.

In the example embodiment, when the event information includes information on the user input to the predetermined area, the processor 730 may identify a size of the screen corresponding to the user input. The processor 730 may control the motor 710 to adjust the size of the exposed display 720 based on an operation pattern corresponding to the identified size. At this time, the size of the screen corresponding to the user input may be designated for each user input in advance.

In the example embodiment, when the event information includes information on the message reception, the processor 730 may determine whether a message includes a first keyword or a second keyword. When the message includes the first keyword, the processor 730 may identify an operation pattern of the motor corresponding to the first keyword and control the motor based on the identified operation pattern. When the message includes the second keyword, the processor 730 may identify an operation pattern of the motor corresponding to the second keyword and control the motor based on the identified operation pattern. A description of such will be made in detail with reference to FIG. 19.

Figure 8:
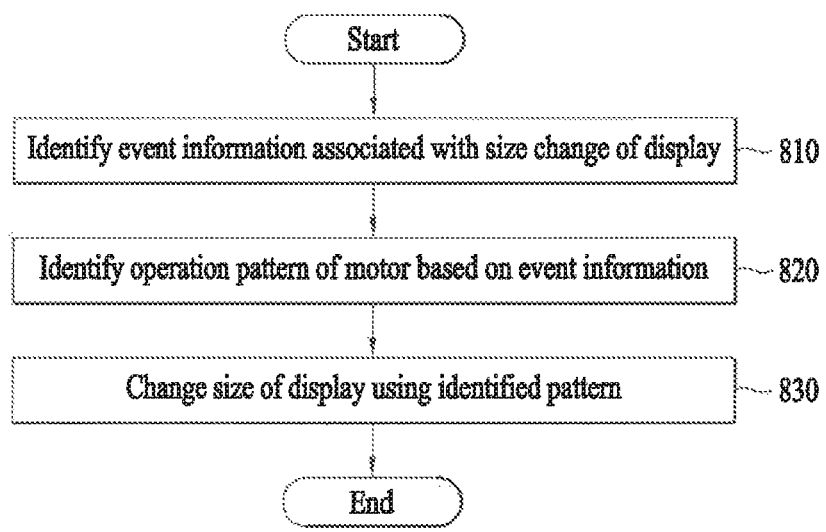
FIG. 8 is a flowchart illustrating a flow of operations in a control method of an electronic device according to an example embodiment of the present disclosure.

FIG. 8 is a flowchart illustrating a flow of operations in a control method of an electronic device according to an example embodiment of the present disclosure. Hereinafter, as would be apparent to one skilled in the art, operations of FIG. 8 may be performed in a different order from that shown in the drawing in some cases.

Referring to FIG. 8, in operation 810, the processor 730 may identify (or receive) event information associated with a size change of the display 720. Specifically, the processor 730 may receive information on an event for which the size change of the display 720 is required. Meanwhile, in the example embodiment, the processor 730 may determine to change a size of the display 720 based on the received event information and identify the event information therefor. For example, the processor 730 may identify content to be displayed based on at least one of the user input and information received from an external source of the electronic device. Also, the processor 730 may verify whether the size of the display 720 is to be changed based on a current size of the display 720 exposed and the content to be displayed. When the size of the display 720 is to be changed, the processor 730 may generate a control signal for a size change of the display 720 based on at least one of pieces of identified information.

An event may be predefined in association with an operation performed in the electronic device 700. The event may include at least one of an execution of a predetermined application, an execution of an application included in a predetermined category, a reception of a message including a predetermined keyword, an execution of predetermined multimedia, a number of applications operating in parallel, a reception of an input to a predetermined area of a screen, a size change of multimedia displayed on the display, a number of texts displayed on the display, a pupil movement of a user acquired through a sensor, message checking, non-checking of a message, playback of predetermined sound, and a predetermined user input. Here, the predetermined user input may include an input related to setting of an operation pattern of the motor, for example, an input of a user setting an operation pattern of a motor through a setting window.

An operation pattern may be designated for each event. For example, a first operation pattern may be designated for the execution of the predetermined application and a second operation pattern may be designated for the reception of the message including the predetermined keyword. Examples of various operation patterns will be described in detail with reference to FIGS. 13 through 16.

In operation 820, the processor 730 may identify an operation pattern of the motor 710 based on the event information. When the event information is identified, the processor 730 may identify an operation pattern designated for the event. In addition, in the example embodiment, the processor 730 may identify a display size to be changed to display content related to the event information.

More specifically, when the event information is identified, the processor 730 may identify a size of a screen corresponding to the event. The processor 730 may identify the size of the display 720 exposed to correspond to the identified size of the screen. The processor 730 may identify an operation pattern corresponding to the identified size of the display 720.

The operation pattern may include an operation pattern for driving the motor 710 at a driving speed corresponding to the size of the display 720 exposed. The operation pattern may be determined based on spline interpolation and an input of a user for a predetermined size of the exposed display 720. At this time, as the spline interpolation, various known spline interpolation techniques (e.g., a Hermite spline and a cubic spline) may be used, and it is apparent for those skilled in the art, so a description of such will be omitted.

In operation 830, the processor 730 may change the size of the display 720 using the identified operation pattern. The processor 730 may control the motor 710 to change the size of the exposed display 720 based on the identified operation pattern. That is, the processor 730 may control the motor 710 to be driven at a motor speed according to the exposure size (or length) of the display 720 indicated by the identified operation pattern.

Accordingly, an aspect in which the display 720 is drawn out may be implemented based on an operation pattern. Meanwhile, the operation pattern may be designated based on event characteristics. In this case, the aspect in which the display 720 is exposed may be expressed based on the operation pattern so that an indirect experience of the event may be provided to the user.

For example, in an event in which an emergency message is received, an operation pattern indicating urgency, that is, an operation pattern in which the motor operates at a high speed may be designated so that the user feels tenser when the emergency message is received.

Figure 9:
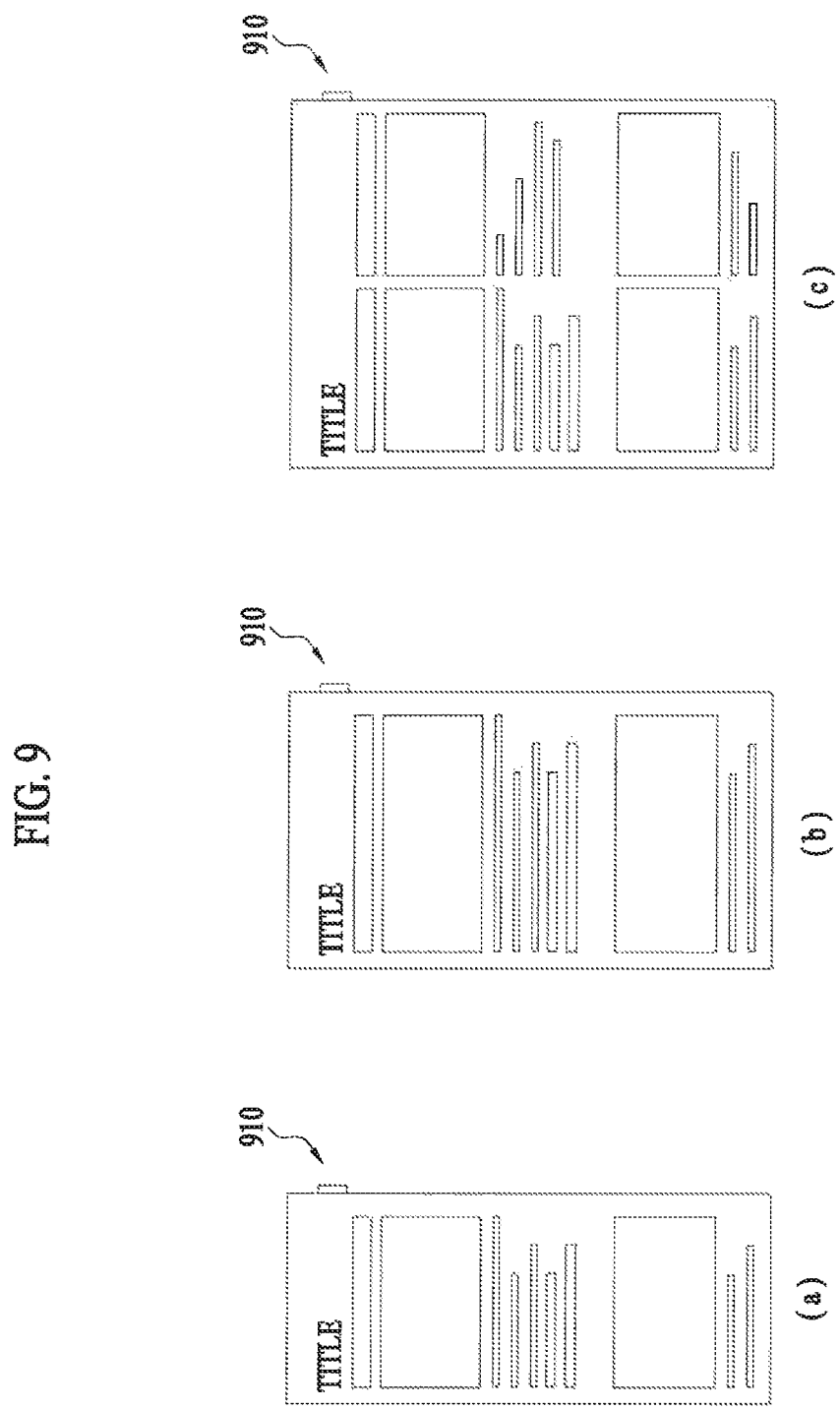
FIGS. 9 through 11 are diagrams illustrating examples of changing a size of a display of an electronic device according to an example embodiment of the present disclosure.
Figure 10:
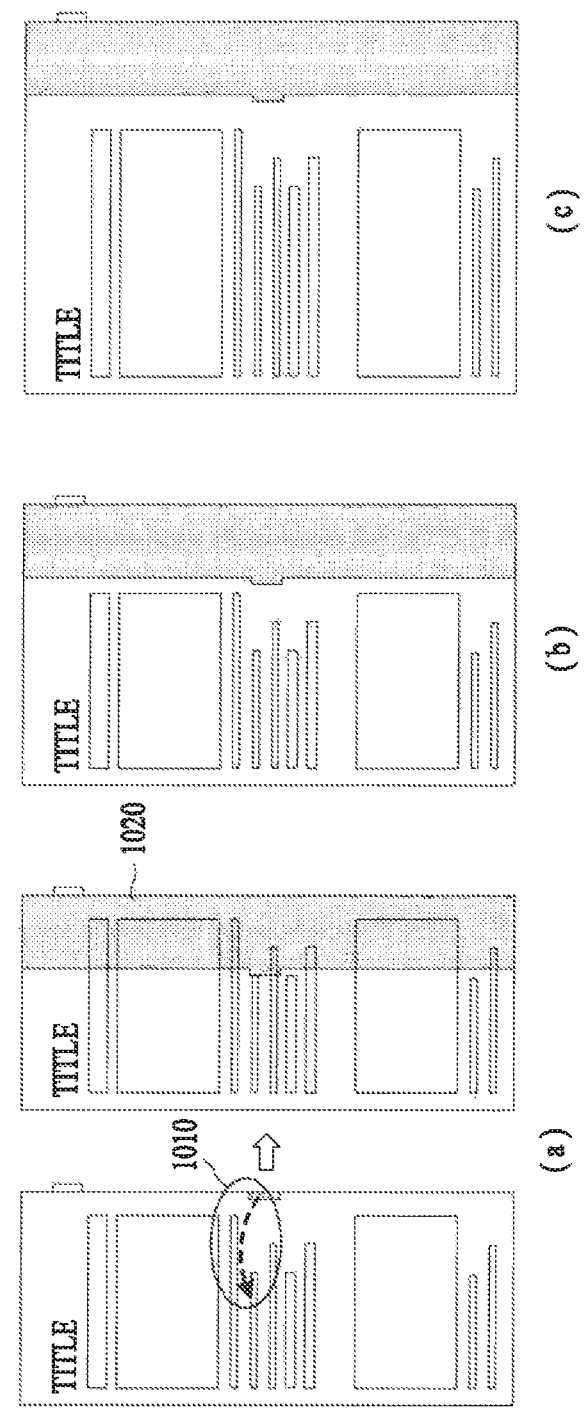
Figure 11:
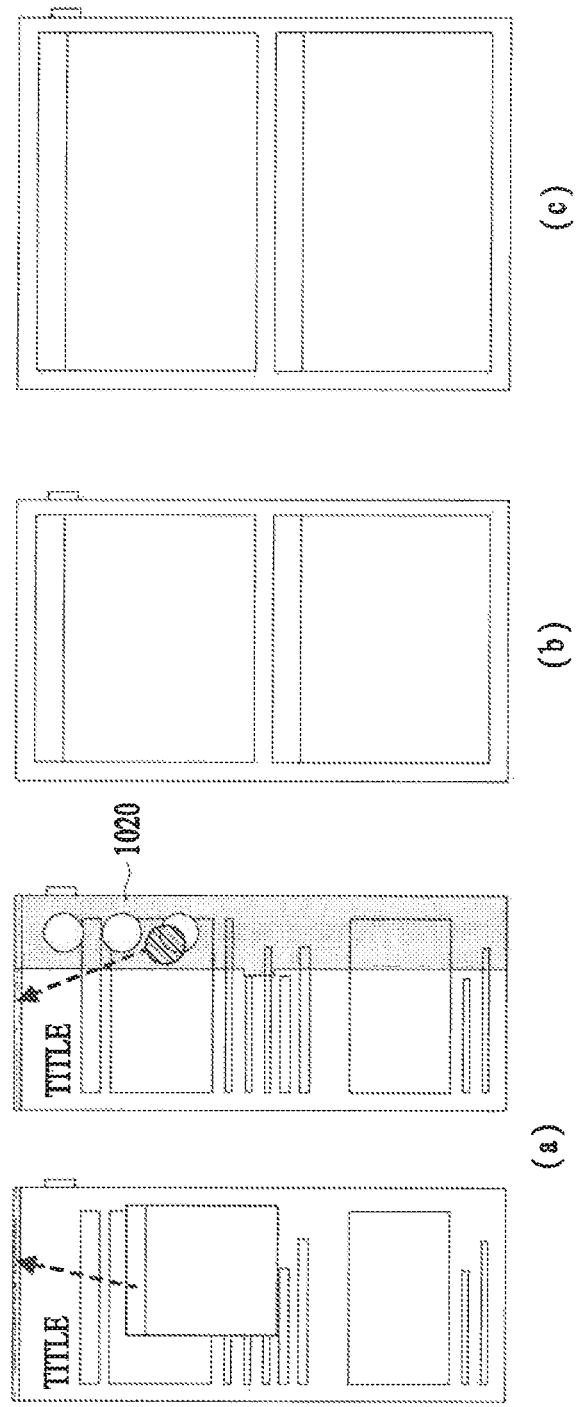

FIGS. 9 through 11 are diagrams illustrating examples of changing a size of a display of an electronic device according to an example embodiment of the present disclosure.

FIG. 9 illustrates a case in which, in response to predetermined event information being identified in the display 720, a size of the exposed display 720 increases.

Specifically, (a) of FIG. 9 shows a default state of the display 720. As illustrated, the electronic device 700 may include a switch 910. In this case, when an event in which a user input to the switch 910 is applied is performed and the processor 730 identifies event information, a size of a screen corresponding to the event information may be identified. When the size of the screen is identified, the processor 730 may operate a motor to correspond to an operation pattern corresponding to the identified size and increase the size of the exposed display 720 as shown in (b) of FIG. 9.

When the event information is additionally identified while the size of the display 720 exposed primarily is increased as shown in (b) of FIG. 9, the processor 730 may increase the size of the exposed display 720 once again.

In the example embodiment, the event information may include information on how many times the user input has been received. The operation pattern may be differently designated for each time of receiving the event information. For example, when an input is applied to the switch 910 once, the operation pattern may be designated to be a first operation pattern. Also, when an input is applied to the switch 910 twice, the operation pattern may be designated to be a second operation pattern. The processor 730 may identify a corresponding operation pattern based on the event information and control the motor 710 in accordance with the identified operation pattern.

FIG. 10 illustrates a case in which, when another application is executed, a size of the exposed display 720 is increased to add a screen for the other application to the display 720.

Referring to (a) of FIG. 10, while a first application is running, a user input 1010 that triggers an execution of a second application may be applied. In this case, content 1020 on the second application (e.g., application that provides information on an application set as favorites) may be displayed on the display 720.

The execution of the second application may be predefined as an event. In this case, as shown in (b) or (c) of FIG. 10, the processor 730 may increase the size of the display 720 exposed.

To increase the size of the exposed display 720, the processor 730 may identify an operation pattern of the motor 710 designated for the event of the execution of the second application. The operation pattern may vary based on the size of the screen designated to correspond to the execution of the second application.

As an example, when the size of the screen is a first size (e.g., 16:9 aspect ratio) as shown in (b) of FIG. 10, the processor 730 may identify the first operation pattern. As another example, when the size of the screen is a second size (e.g., 4:3 aspect ratio) as shown in (c) of FIG. 10, the processor 730 may identify the second operation pattern.

The processor 730 may control the motor 710 to change the size of the exposed display 720 based on the identified operation pattern.

FIG. 11 illustrates a case in which a display form of a screen provided by the display 720 is changed in response to a user input, a required size of the screen is correspondingly changed and thus, the size of the exposed the display 720 is increased.

Referring to (a) of FIG. 11, the processor 730 may receive a user input for changing a display form of a screen. As an example, the user input for changing the display form of the screen may be a drag input that moves memo content to atop bar. As another example, the user input for changing the display form of the screen may be a drag input that moves a predetermined icon included in bar content representing a favorite application to the top bar.

Such inputs may be an input that changes the display form of the screen such that the content moved to the top bar or information on the icon is displayed in an area including the top bar of the screen.

At this time, the user input for changing the display form of the screen may be designated to an event in advance. In this case, the processor 730 may identify a size of the screen corresponding to the event information based on the event information. In other words, the size of the screen designated in relation to changing the display form of the screen may be identified.

As shown in (b) or (c) of FIG. 11, the processor 730 may identify a size of the display 720 exposed to correspond to the identified size of the screen and control the motor 710 to change the size of the exposed display 720 based on an operation pattern corresponding to the identified size.

For example, when the size of the display 720 exposed to correspond to the identified size of the screen corresponds to the size of the display 720 shown in (b) of FIG. 11, the processor 730 may control the motor 710 to change the size of the exposed display 720 based on the first operation pattern corresponding to the identified size.

When the size of the display 720 exposed to correspond to the identified size of the screen corresponds to the size of the display 720 shown (c) of FIG. 11, the processor 730 may control the motor 710 to change the size of the exposed display 720 based on the second operation pattern corresponding to the identified size.

FIG. 12 is a diagram illustrating an example of setting an operation pattern of a motor for each application installed in an electronic device according to an example embodiment of the present disclosure.

(a) of FIG. 12 shows a window for setting an operation pattern for each application. The processor 730 may receive a user input that executes an application for setting an operation pattern. In this case, the processor 730 may display a window as shown in (a) of FIG. 12.

Referring to (a) of FIG. 12, an operation pattern may include a basic mode, a low speed mode, a high speed mode, an advanced mode, and a user setting mode. The basic mode, the low speed mode, the high speed mode, and the advanced mode may indicate different operation patterns designated in advance. The user setting mode may be a custom mode that is created based on a user input.

For each operation pattern, icons for receiving a user's selecting input may be displayed in a left portion. When an input is applied to one of the displayed icons, a corresponding operation pattern may be selected.

When one of the basic mode, the low speed mode, the high speed mode, and the advanced mode is selected, a predetermined operation pattern may be selected. Examples of the basic mode, the low speed mode, and the high speed mode will be described with reference to FIG. 13, and an example of the advanced mode will be described with reference to FIG. 14.

Here, each of the basic mode, the low speed mode, and the high speed mode may indicate a case in which a motor speed is set to a predetermined value in relation to the corresponding mode.

The advanced mode is a mode in which a speed for each section of the size of the display is changed, and may be a mode that provides a sense of advance (or advanced feeling) to the user.

In the user setting mode, an additional window may be displayed because an additional process of generating an operation pattern based on a user input is required. When an input of the operation pattern for the displayed window is completed, the input operation pattern may be selected.

When the operation pattern is selected, a window as shown in (b) of FIG. 12 may be generated. Specifically, (b) of FIG. 12 may include a list of applications installed in the electronic device 700. For each application, an icon for selecting the corresponding application may be displayed on the right. When an input is applied to one of the displayed icons, an operation pattern of a corresponding application may be designated as an operation pattern selected through (a) of FIG. 12.

For example, when the operation pattern is set to the basic mode as shown in (a) of FIG. 12, and when a gallery application, a video application, and an alarm/clock application are selected as shown in (b) of FIG. 12, the size change of the display 720 may be performed in the basic mode when the gallery application, the video application, and the alarm/clock application are executed.

FIGS. 13 through 16 are diagrams illustrating examples of an operation pattern of a motor of an electronic device according to an example embodiment of the present disclosure.

FIG. 13 illustrates an example of an operation pattern of the motor 710 provided as an option to be selected by a user in the example of FIG. 12. Specifically, (a) of FIG. 13 shows an example of an operation pattern corresponding to the basic mode, (b) of FIG. 13 shows an example of an operation pattern corresponding to the low speed mode, and (c) of FIG. 13 shows an example of an operation pattern corresponding to the high speed mode.

Referring to (a) of FIG. 13, in a case of the basic mode, a motor speed based on a pull-out length may be maintained to be a predetermined value such as 50.

Referring to (b) of FIG. 13, in a case of the low speed mode, a motor speed based on a pull-out length may be maintained to be less than the predetermined value of the basic mode, for example, 25. In this case, a size change speed of the display 720 of the low speed mode may be implemented to be lower than a size change speed of the display 720 of the basic mode.

Referring to (c) of FIG. 13, in a case of the high speed mode, a motor speed based on a pull-out length may be maintained to be less than the predetermined value of the basic mode, for example, 25. In this case, a size change speed of the display 720 of the low speed mode may be implemented to be lower than a size change speed of the display 720 of the basic mode.

Figure 14:
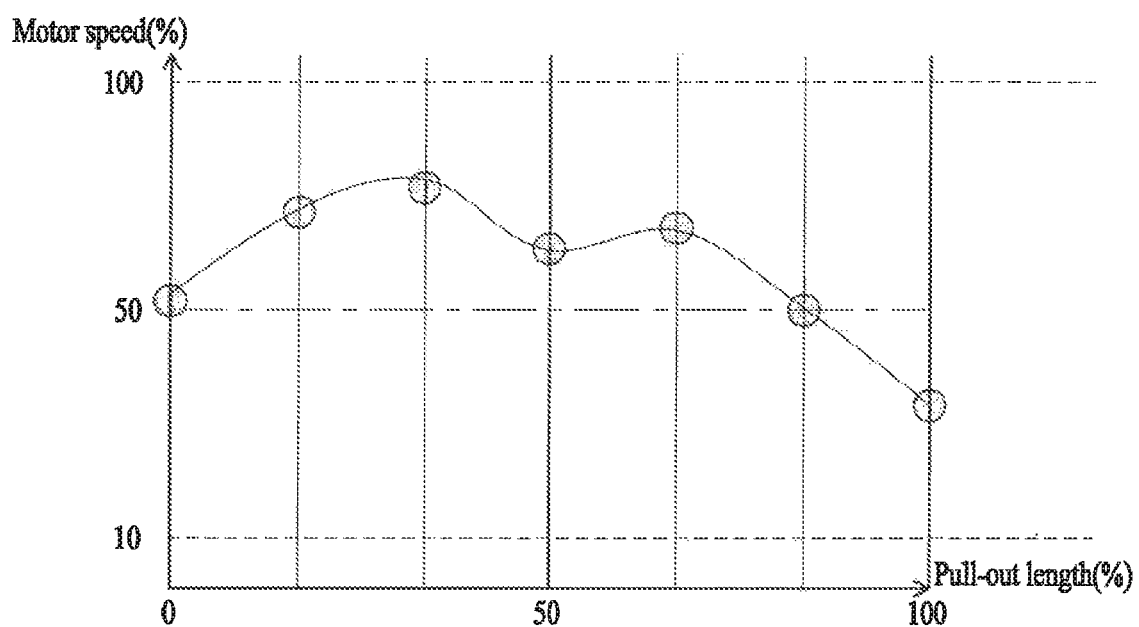

FIG. 14 illustrates an example of an advanced mode among operation patterns of the motor 710 provided as options to be selected by a user in the example of FIG. 12.

Referring to FIG. 14, in an operation pattern of the advanced mode, motor speeds of partial sections of at least one of pull-out lengths may be designated to be different from each other. For example, a motor speed obtained when the pull-out length is 0 may be different from a motor speed obtained when the pull-out length is 50. In this example, the motor speed may be changed at least once while a size of the exposed display 720 is changed.

In a case of the advanced mode, the user may experience an advanced feeling when the display is drawn out.

FIG. 15 illustrates an example of operation patterns appearing in a case in which a size of the exposed display 720 increases and in a case in which a size of the exposed display 720 decreases.

Specifically, (a) of FIG. 15 shows an example of the case in which the size of the exposed display 720 increases. For example, when the display 720 is in a default state, and when a size of a screen corresponding to event information identified by the processor 730 is related to 'the pull-out length 100', the processor 730 may increase the size of the exposed display 720 based on the operation pattern as shown in (a) of FIG. 15.

(b) of FIG. 15 shows an example of the case in which the size of the exposed display 720 decreases. For example, in a state in which the display 720 is maximally exposed, when a size of a screen corresponding to event information identified by the processor 730 is related to 'the pull-out length 0', the processor 730 may decrease the size of the exposed display 720 based on the operation pattern as shown in (b) of FIG. 15.

Meanwhile, (a) and (b) of FIG. 15 show the operation patterns with the constant motor speed as examples, and the operation pattern is not limited to the examples.

Figure 16:
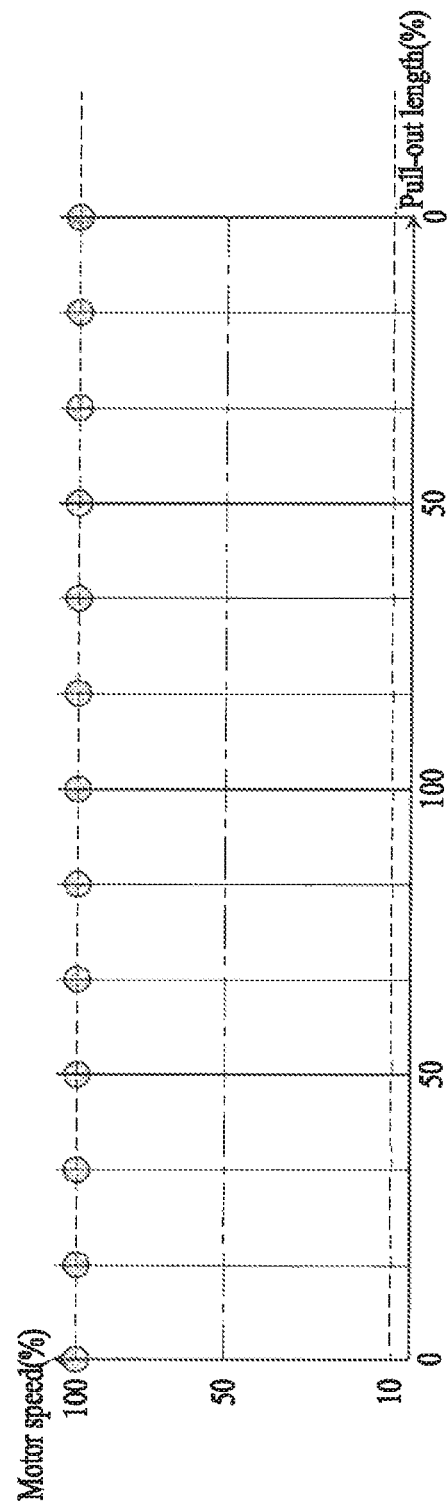

FIG. 16 illustrates an example of an operation pattern obtained in a case in which a size of the exposed display 720 is increased and decreased.

The size of the display 720 exposed may increase and then stop increasing, and may increase and then decrease. Specifically, as illustrated in FIG. 16, the pull-out length of the display 720 may increase up to 100 and then decrease to 0.

That is, it can be seen that a range of the pull-out length corresponding to an x axis of the operation pattern is implemented in various forms as shown in FIG. 16. However, FIG. 16 merely shows an example of the operation pattern, and the present disclosure is not limited to the example.

Figure 17:
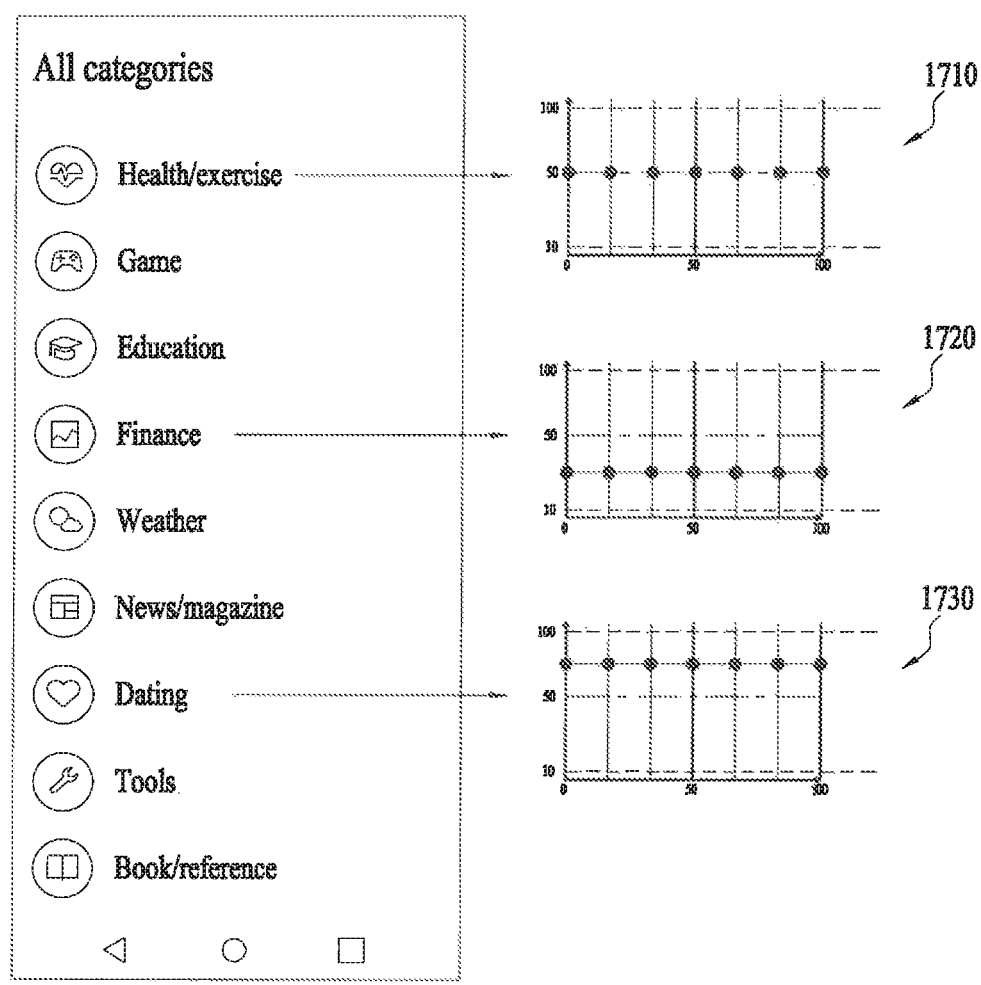
FIG. 17 is a diagram illustrating an example of setting an operation pattern of a motor for each category of an application installed in an electronic device according to an example embodiment of the present disclosure.

FIG. 17 is a diagram illustrating an example of setting an operation pattern of a motor for each category of an application installed in an electronic device according to an example embodiment of the present disclosure.

Applications installed in the electronic device 700 may be included in one of a plurality of categories designated in advance based on characteristics thereof. For example, the plurality of categories may be provided in various types as shown in FIG. 17.

In an example embodiment, an operation pattern of the motor 710 may be set for each category. For example, as illustrated in FIG. 17, a first operation pattern 1710 may be set for a health/exercise category, a second operation pattern 1710 may be set for a financial category, and a third operation pattern 1710 may be set for a dating category. In this example, when an application belonging to the health/exercise category is executed, the first operation pattern 1710 may be applied to change the size of the display 720. When an application belonging to the financial category is executed, the second operation pattern 1720 may be applied to change the size of the display 720. In a case of the dating category, the third operation pattern 1710 may be applied to change the size of the display 720.

Meanwhile, as illustrated, different operation patterns may be set for each category, but the present disclosure is not limited thereto. In some cases, at least some categories may be set with the same operation pattern.

FIG. 18 is a diagram illustrating an operation pattern of a motor when a camera application is executed in an electronic device according to an example embodiment of the present disclosure.

(a) of FIG. 18 shows an example of a case in which a typical camera application is executed. In general, as shown in (a) of FIG. 18, an image acquired through a camera may be displayed while a size of a display implemented at the time of manufacturing the electronic device is fixed.

(b) of FIG. 18 shows an example of a case in which a camera application designated as an event is executed in the electronic device 700 according to an example embodiment of the present disclosure. A default state of the electronic device 700 may correspond to the size of the electronic device shown in (a) of FIG. 18. When event information indicating the execution of the camera application is identified (or received) in the default state, the processor 730 may identify an operation pattern related to the execution of the camera application and drive the motor 710 based on the identified operation pattern, thereby changing the size of the display 720 exposed as shown in (b) of FIG. 18.

In the example embodiment, when the event information indicating the execution of the camera application is identified, the processor 730 may identify a size of a screen corresponding to the event information. The processor 730 may identify an operation pattern designated in relation to at least one of the identified size of the screen and the event of the execution of the camera application. The processor 730 may drive the motor 710 at a motor speed according to the identified operation pattern.

Meanwhile, the identified operation pattern may be an operation pattern that increases the size of the display 720 exposed, and may be as shown in (c) of FIG. 18, for example.

Figure 20:
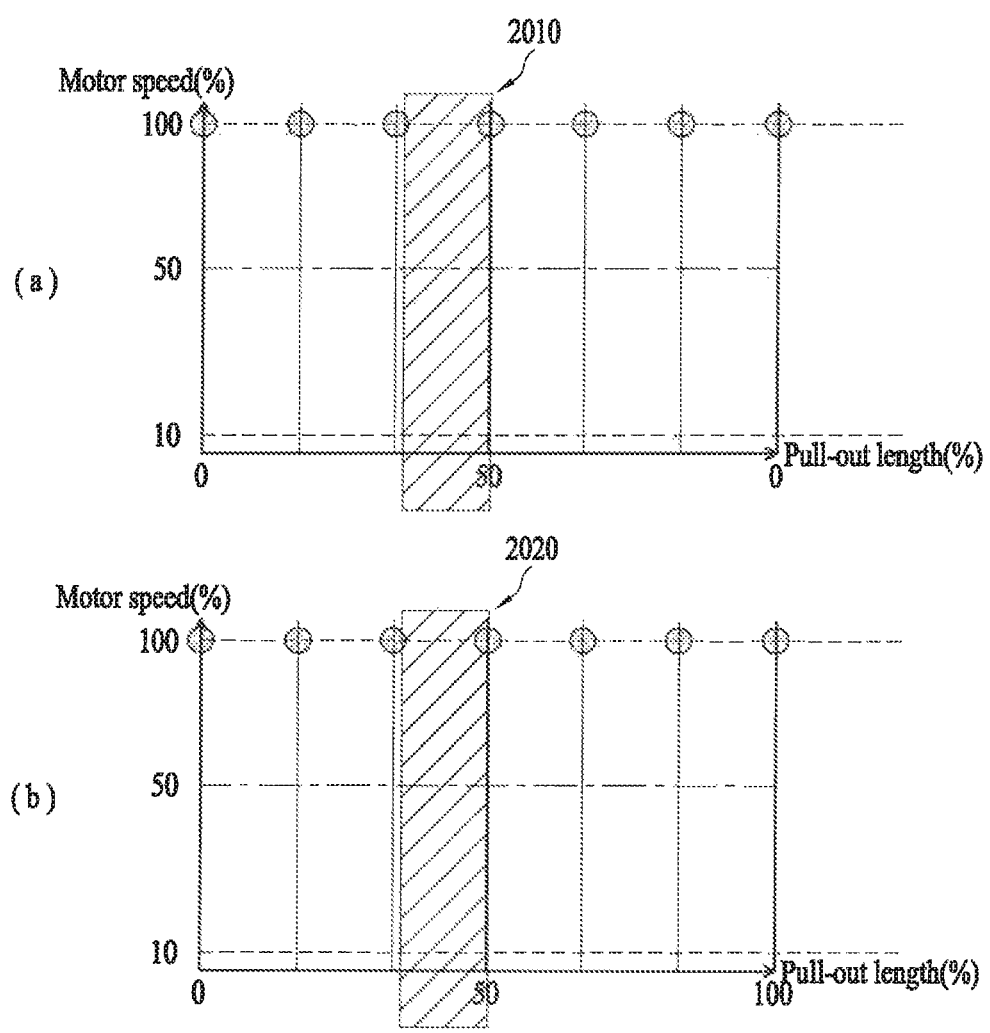

FIGS. 19 through 21 are diagrams illustrating an operation pattern of a motor when a message is received in an electronic device according to an example embodiment of the present disclosure.

(a) of FIG. 19 shows the electronic device 700 including the display 720 in a default state before a message is received, and (b) of FIG. 19 shows the electronic device 700 including an exposure size of the display 720 increasing when a message is received.

A message reception may be designated as an event in advance. When event information associated with the message reception is identified based on the designation, the processor 730 may expand the display 720 as shown in (b) of FIG. 19.

In the example embodiment, an operation pattern shown in (c) of FIG. 19 may be designated for the event related to the message reception. In this case, when the event information associated with the message reception is identified, the processor 730 may identify the operation pattern of (c) of FIG. 19. The processor 730 may drive the motor 710 based on the identified operation pattern so that the display 720 is expanded as shown in (b) of FIG. 19.

In the example embodiment, the event related to the message reception may be further divided in relation to whether a keyword is included. For example, the event related to the message reception may include a first event related to a reception of a message including a first keyword and a second event related to a reception of a message including a second keyword.

In this case, when a message is received, the processor 730 may identify event information based on an identification of the first keyword or the second keyword included in the received message. For example, when it is verified that the message including the first keyword is received, first event information may be received. When it is verified that the message including the second keyword is received, second event information may be received. The processor 730 may identify an operation pattern based on the event information and drive the motor 710 based on the identified operation pattern, thereby changing the size of the display 720 exposed.

In the example embodiment, the playback of the predetermined sound may be designated as an event. When event information associated with the playback of the predetermined sound is identified based on the designation, the processor 730 may change the size of the display 720 as shown in (b) of FIG. 19. Here, the predetermined sound may include a notification sound notifying that a message is received, for example, sound "Katalk."

A sound may have a change in pitch or volume according to time, and an operation pattern may be determined based on the pitch or volume of the sound. As an example, the operation pattern may be formed by matching the pitch of the sound to the motor speed and matching a sound playback time to the pull-out length of the display 720. As another example, the operation pattern may be formed by matching the volume of the sound to the motor speed and matching a sound playback time to the pull-out length of the display 720. As such, the operation pattern formed based on the sound may be represented as shown in (d) of FIG. 19.

However, it is merely an example, and it is apparent that a predetermined operation pattern may be designated for the sound playback event irrespective of the change in pitch or volume of the sound.

When the predetermined sound is played, the processor 730 may identify event information and identify an operation pattern (e.g., (d) of FIG. 19) designated for the event information based on the identification. Through this, the processor 730 may change the size of the display 720 as shown in (b) of FIG. 19.

Although not shown, in some cases, the electronic device 700 may include a light emitting diode (LED). In such cases, an operation pattern may be designated according to a light emission type (e.g., light emission intensity) of the LED. For example, the operation pattern may be formed by matching a light emission state of the LED to the motor speed and matching a light emission time of the LED to the pull-out length of the display 720. However, it is merely an example, and it is apparent that a predetermined operation pattern may be designated for a light emission event of the LED irrespective of the light emission type of the LED.

In this case, when the LED emits light, the processor 730 may identify event information and identify a designated operation pattern (e.g., (c) of FIG. 19), thereby changing the size of the display 720 as shown in (b) of FIG. 19.

FIG. 20 illustrates an example of an operation pattern based on whether a received message is checked. Specifically, (a) of FIG. 20 illustrates a case in which a received message is not checked, and (b) of FIG. 20 illustrates a case in which a received message is checked.

The message may be checked by an input of a user. When a user input for checking the message is received in a predetermined pull-out length range, the processor 730 may determine that the message is checked. When the user input for checking the message is not received in the predetermined pull-out length range, the processor 730 may determine that the message is checked.

The predetermined pull-out length range may be included while an exposure size of the display 720 is changed. For example, as shown in (a) and (b) of FIG. 20, the predetermined pull-out length range may be predetermined ranges 2010 and 2020 in which a pull-out length is less than or equal to 50.

(a) of FIG. 20 shows an operation pattern of a case in which a user input is not received in the predetermined pull-out length range 2010, that is, a case in which a message is not checked. According to (a) of FIG. 20, the predetermined pull-out length range 2010 may exist in a section between 0 and 50, in which the pull-out length increases.

When a user input is not received in the predetermined pull-out length range 2010, the pull-out length may decrease from 50 to 0.

(b) of FIG. 20 shows an operation pattern of a case in which a user input is received in the predetermined pull-out length range 2010, that is, a case in which a message is checked. According to (b) of FIG. 20, the predetermined pull-out length range 2020 may exist in a section between 0 and 50, in which the pull-out length increases. When a user input is received in the predetermined pull-out length range 2020, the pull-out length may increase from 50 to 100.

FIG. 21 illustrates an example of correcting an operation pattern based on a state of the electronic device 700. Specifically, FIG. 21 illustrates a case in which an operation pattern is corrected when the electronic device 700 is a landscape mode.

According to (a) of FIG. 21, the electronic device 700 may be placed to be in the landscape mode. For example, as illustrated, the landscape mode may be a case in which a long side of four sides constituting hardware of the electronic device 700 having a rectangular shape is parallel to a ground. Since it is easy for those skilled in the art, a detailed description will be omitted.

In an example embodiment, when event information is identified, the processor 730 may identify a state of the electronic device 700 (e.g., a mode of the electronic device 700) prior to identifying an operation pattern. When the electronic device 700 is in a landscape mode, the processor 730 may reduce an overall speed of an operation pattern related to the identified event information by 10% so that the size of the display 720 is changed at a lower speed.

However, it is merely an example, and a state related to a correction of the operation pattern may be implemented as various states, for example, a battery state (e.g., power saving mode) of the electronic device 700 or a portrait mode.

FIGS. 22 through 25 illustrate examples of a plurality of operation patterns related to one event.

(a) and (b) of FIG. 22 show respective examples of two operation patterns related to one event. Specifically, (a) of FIG. 22 shows an operation pattern related to a pull-out length ranging between 0 and 50, and (b) of FIG. 22 shows an operation pattern related to a pull-out length ranging between 50 and 700.

(a) and (b) of FIG. 22 shows different forms of operation patterns, but it is merely an example.

In the example embodiment, when event information is identified, the processor 730 may identify a plurality of operation patterns (e.g., the first operation pattern and the second operation pattern) related to the event information. In this case, the processor 730 may additionally identify information associated with the electronic device 700 to determine one operation pattern of the plurality of operation patterns. The processor 730 may drive the motor 710 according to the determined operation pattern, thereby changing the size of the display 720.

The following descriptions will be made with reference to FIGS. 23 through 26 under an assumption that the operation patterns of FIG. 22 are applied. For convenience of descriptions, the operation pattern of (a) of FIG. 22 is referred to as a first operation pattern, and the operation pattern of (b) of FIG. 22 is referred to as a second operation pattern.

Figure 23:
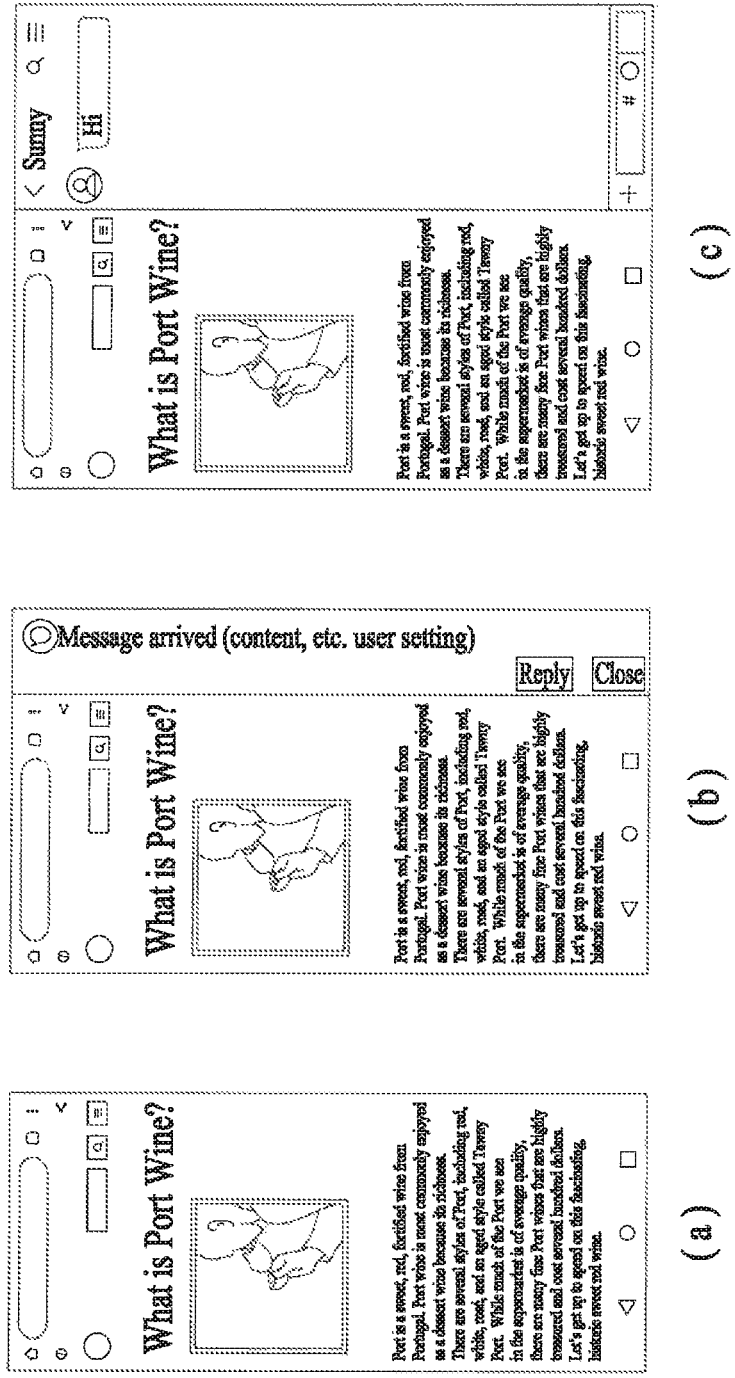

FIG. 23 illustrates a case in which the first operation pattern and the second operation pattern are designated in association with a message receiving event so that an exposure size of the display 720 is changed based on the designation.

When a message receiving event occurs, the processor 730 may identify event information associated with a message reception. The first operation pattern and the second operation pattern may be designated in association with the identified event information. In this case, the processor 730 may additionally identify a state of the electronic device 700 related to an event. For example, the processor 730 may identify a state of the display 720 before a message is received or a user input applying state in relation to a message.

When the state of the display 720 before the message is received is a state in which the exposure size is the default as shown in (a) of FIG. 23, the processor 730 may drive the motor 710 using the first operation pattern and change the size of the display 720 as shown in (b) of FIG. 23.

When a user input (e.g., a touch input to a reply icon) is applied to content displayed in association with the message reception, the processor 730 may drive the motor 710 using the second operation pattern and change the size of the display 720 as shown in (c) of FIG. 23.

Figure 24:
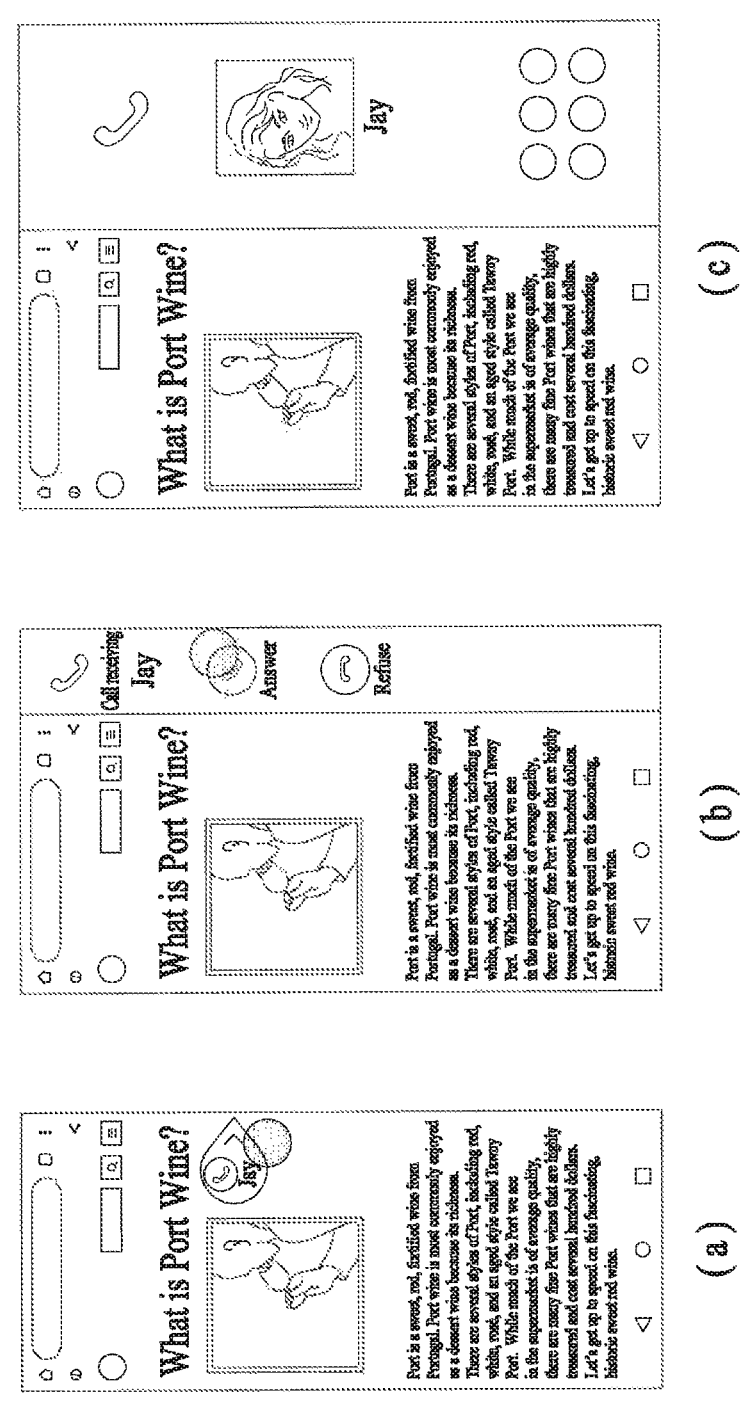

FIG. 24 illustrates a case in which the first operation pattern and the second operation pattern are designated in association with a call receiving event so that an exposure size of the display 720 is changed based on the designation.

When the call receiving event occurs, the processor 730 may identify event information associated with a call reception. The first operation pattern and the second operation pattern may be designated in association with the identified event information. In this case, the processor 730 may additionally identify a state of the electronic device 700 related to an event. For example, the processor 730 may identify a current state of the display 720 or a user input applying state in relation to a call.

When the current state of the display 720 is a state in which the exposure size is the default as shown in (a) of FIG. 24, and when a call-related user input (e.g., a touch input to a phone icon) is applied, the processor 730 may drive the motor 710 using the first operation pattern and change the size of the display 720 as shown in (b) of FIG. 24.

When the current state of the display 720 is a state in which the exposure size is "pull-out length 50" as shown in (b) of FIG. 24, and when a call-related user input (e.g., a touch input to a call receiving icon) is applied, the processor 730 may drive the motor 710 using the second operation pattern and change the size of the display 720 as shown in (c) of FIG. 24.

Figure 25:
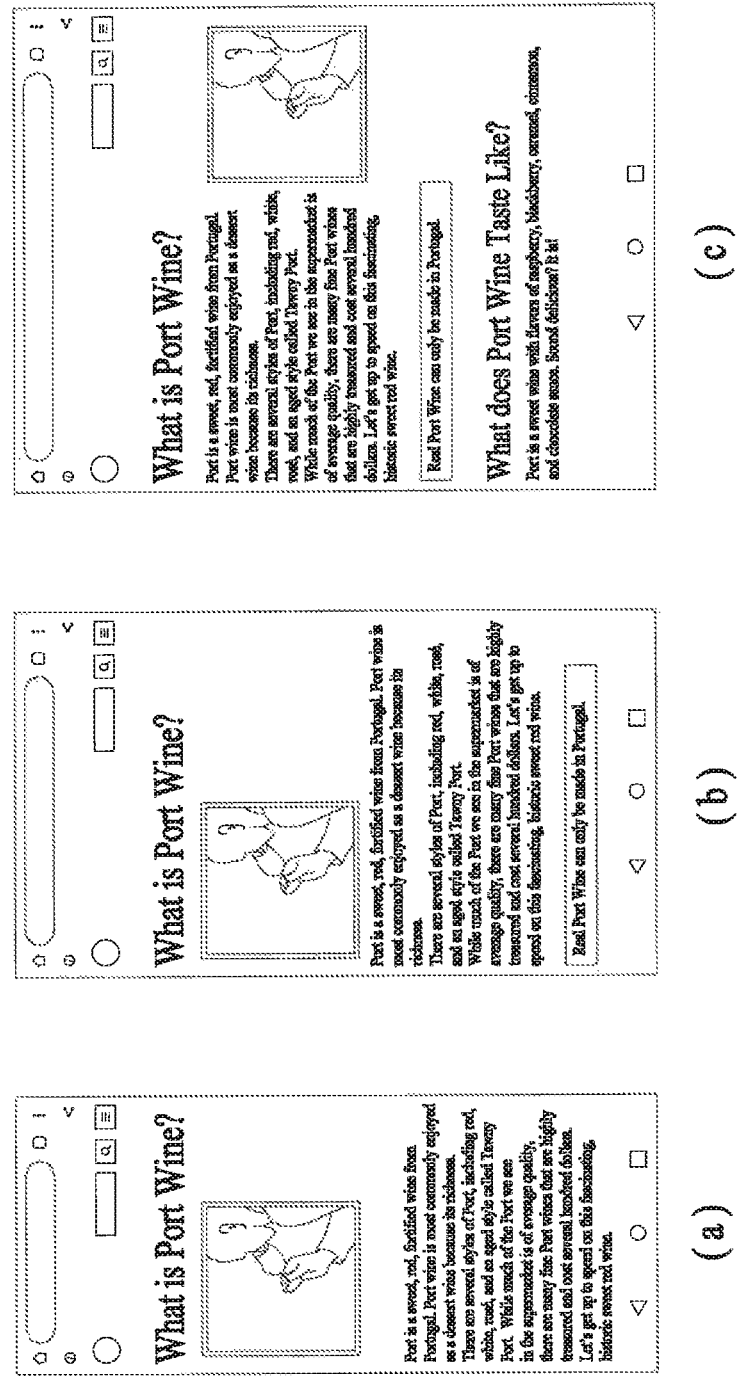

FIG. 25 illustrates a case in which the first operation pattern and the second operation pattern are designated in association with a text displaying event so that an exposure size of the display 720 is changed based on the designation. The text displaying event may indicate a case in which a number of texts displayed on a screen of the display 720 is greater than or equal to a predetermined value.

When the text displaying event occurs, the processor 730 may identify event information associated with displaying the text. The first operation pattern and the second operation pattern may be designated in association with the identified event information.

In this case, the processor 730 may additionally identify a state of the electronic device 700 related to an event. For example, the processor 730 may identify a state of the display 720 before a text is displayed or a user input applying state.

When the state of the display 720 before the text is displayed is a state in which the exposure size is the default as shown in (a) of FIG. 25, the processor 730 may drive the motor 710 using the first operation pattern and change the size of the display 720 as shown in (b) of FIG. 25.

When a predetermined user input (e.g., double-tapping) is applied, the processor 730 may drive the motor 710 using the second operation pattern and change the size of the display 720 as shown in (c) of FIG. 25.

In an example embodiment, changing the size of the display 720 as shown in (c) of FIG. 25 may be performed in a case in which a size of a text displayed on a screen is increased.

FIG. 26 is a diagram illustrating an example of playing multimedia on an electronic device according to an example embodiment of the present disclosure.

When a multimedia playback event occurs, the processor 730 may identify related event information. The event information may include information on a multimedia size.

The processor 730 may identify a size of a screen corresponding to the event information based on the event information. For example, the processor 730 may identify a size of a screen corresponding to a width and height ratio of the multimedia being played. The processor 730 may identify the size of the display 720 exposed to correspond to the size of the screen. The processor 730 may control the motor 710 to change the size of the exposed display 720 based on an operation pattern corresponding to the identified size.

When the multimedia ratio corresponds to a size ratio (e.g., 21:9) of the screen provided by the display 720 in a default state, the processor 730 may maintain the default state as shown in (a) of FIG. 25.

When the multimedia ratio is 16:9, the processor 730 may change a display size to a size as shown in (b) of FIG. 26 based on a related operation pattern. When the multimedia ratio is 4:3, the processor 730 may change a display size to a size as shown in (c) of FIG. 26 based on a related operation pattern.

At this time, an operation pattern or a screen size for each multimedia ratio may be designated in advance.

Figure 27:
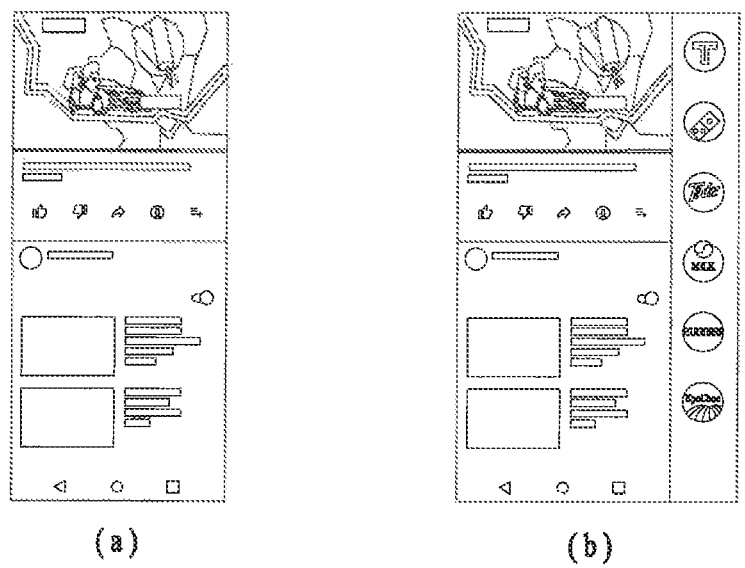
FIG. 27 is a diagram illustrating an example of providing recommended content in an electronic device according to an example embodiment of the present disclosure.

FIG. 27 is a diagram illustrating an example of providing recommended content in an electronic device according to an example embodiment of the present disclosure.

(a) of FIG. 27 shows an example in which a video application is running. When a video is played, the processor 730 may receive content information associated with the video being played. A content information reception may be designated as an event. In this case, the processor 730 may identify event information associated with the content information.

At this time, the identified event information may include, for example, a number of contents related to the video being played or a method of providing the contents. For such event information, an operation pattern of the motor 710 may be previously designated.

In this case, in response to the event information being identified, the processor 730 may identify an operation pattern related to the identified event information and drive the motor 710 such that the display 720 is changed based on the identified operation pattern.

When the display 720 is changed, the changed display may be as shown in (b) of FIG. 27. At this time, information related to the event may be displayed in a portion to which the display 720 is expanded and exposed.

In some cases, the processor 730 may identify position information of the electronic device 700 through a global positioning sensor (GPS). A case in which the electronic device 700 is located at a predetermined position may also be designated as an event. In such cases, the processor 730 may identify an operation pattern related to the event and drive the motor 710 such that the display 720 is changed based on the identified operation pattern.

According to an example embodiment of the present disclosure, an electronic device and a control method of the electronic device may allow a display to be automatically changed in size based on event information so that a size change of the display is easily and quickly performed depending on a situation.

According to an example embodiment of the present disclosure, an electronic device and a control method of the electronic device may provide various operation patterns according to an event in association with a size change of an exposed display, thereby improving usability of the electronic device.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

The invention claimed is:
1. An electronic device comprising:
   a motor;
   a flexible display disposed to be changed in a size to which the flexible display is exposed to one side in accordance with an operation of the motor; and
   a processor configured to control the display and the motor,
   wherein the processor is configured to:
   identify event information associated with a change in a size of an exposed display of the flexible display;
   identify an operation pattern of the motor based on the event information; and
   change the size of the exposed display based on the identified operation pattern,
   wherein the operation pattern of the motor is designated for each event information in advance.

2. The electronic device of claim 1, wherein the operation pattern comprises an operation pattern for driving the motor at a driving speed identified based on the size of the exposed display.

3. The electronic device of claim 1, wherein the operation pattern comprises an operation pattern in which a motor driving speed is changed at least once while the size of the exposed display is changed.

4. The electronic device of claim 1, wherein the operation pattern is determined based on at least one of spline interpolation and a user input that indicates a speed of the motor based on a display length changed to correspond to the exposed display, and
   the user input comprises motor speed information on at least one section based on a range of the display length.

5. The electronic device of claim 1, wherein when the event information comprises information on playback of predetermined multimedia, the processor is configured to:
   identify a size of a screen corresponding to the predetermined multimedia;
   identify a size of the exposed display to correspond to the identified size of the screen; and
   control the motor to change the size of the exposed display according to an operation pattern corresponding to the identified size.

6. The electronic device of claim 1, wherein when the event information comprises information on displaying a text, the processor is configured to:
   identify a size of a screen corresponding to at least one of a number of the text and a text size;
   identify a size of the exposed display to correspond to the identified size of the screen; and
   control the motor to change the size of the exposed display according to an operation pattern corresponding to the identified size.

7. The electronic device of claim 1, wherein the operation pattern comprises at least one of operation pattern information corresponding to an application installed in the electronic device and operation pattern information corresponding to a category including the application, and
   the processor is configured to:
   identify a size of a screen corresponding to a predetermined application when the event information comprises information on an execution of the predetermined application; and
   control the motor to change the size of the exposed display based on the identified size and the operation pattern information corresponding to the application.

8. The electronic device of claim 1, wherein the processor is configured to:
   receive a user input corresponding to the identified event information;
   identify an operation pattern related to the user input; and control the motor to change the size of the exposed display according to the identified operation pattern.

9. The electronic device of claim 1, wherein the processor is configured to:
verify, when the event information comprises information on a reception of a message, whether the message includes a first keyword or a second keyword;
identify, when the message includes the first keyword, a first operation pattern of the motor corresponding to the first keyword and control the motor based on the first operation pattern; and
identify, when the message includes the second keyword, a second operation pattern corresponding to the second keyword and control the motor based on the second operation pattern.

10. The electronic device of claim 1, wherein the event information is associated with at least one of an execution of a predetermined application, an execution of an application included in a predetermined category, a reception of a message including a predetermined keyword, an execution of predetermined multimedia, a number of applications operating in parallel, a reception of an input to a predetermined area of the flexible display, a size change of multimedia displayed on the flexible display, a number of texts displayed on the flexible display, a size of the text, a pupil movement of a user acquired through a sensor, message checking, non-checking of a message, playback of predetermined sound, and a predetermined user input, and
the predetermined user input comprises an input related to setting of an operation pattern of the motor.

11. A method of controlling an electronic device comprising a motor and a flexible display disposed to be changed in a size to which the flexible display is exposed to one side in accordance with an operation of the motor, the method comprising:
identifying event information associated with a change in a size of an exposed display of the flexible display;
identifying an operation pattern of the motor based on the event information; and
changing the size of the exposed display based on the identified operation pattern,
wherein the operation pattern of the motor is designated for each event information in advance.

12. The method of claim 11, wherein the operation pattern comprises an operation pattern for driving the motor at a driving speed identified based on the size of the exposed display.

13. The method of claim 11, wherein the operation pattern comprises an operation pattern in which a motor driving speed is changed at least once while the size of the exposed display is changed.

14. The method of claim 11, wherein the operation pattern is determined based on at least one of spline interpolation and a user input that indicates a speed of the motor based on a display length changed to correspond to the exposed display, and
the user input comprises motor speed information on at least one section based on a range of the display length.

15. The method of claim 11, wherein when the event information comprises information on playback of predetermined multimedia, the identifying of the operation pattern comprises:
identifying a size of a screen corresponding to the predetermined multimedia;
identifying a size of the exposed display to correspond to the identified size of the screen; and
identifying an operation pattern corresponding to the identified size, and
the changing of the size comprises controlling the motor to change the size of the exposed display according to the identified operation pattern.

16. The method of claim 11, wherein when the event information comprises information on displaying a text, the identifying of the operation pattern comprises:
identifying a size of a screen corresponding to at least one of a number of the text and a text size;
identifying a size of the exposed display to correspond to the identified size of the screen; and
identifying an operation pattern corresponding to the identified size, and
the changing of the size comprises controlling the motor to change the size of the exposed display according to the identified operation pattern.

17. The method of claim 11, wherein the operation pattern comprises at least one of operation pattern information corresponding to an application installed in the electronic device and operation pattern information corresponding to a category including the application,
the identifying of the operation pattern comprises:
identifying a size of a screen corresponding to a predetermined application when the event information comprises information on an execution of the predetermined application; and
identifying an operation pattern corresponding to the identified size, and
the changing of the size comprises controlling the motor to change the size of the exposed display based on the identified size and the operation pattern information corresponding to the application.

18. The method of claim 11, wherein the identifying of the operation pattern comprises:
receiving a user input corresponding to the identified event information; and
identifying an operation pattern related to the user input, and
the changing of the size comprises controlling the motor to change the size of the exposed display according to the identified operation pattern.

19. The method of claim 11, wherein the identifying of the operation pattern comprises:
verifying, when the event information comprises information on a reception of a message, whether the message includes a first keyword or a second keyword; and
identifying, when the message includes the first keyword, a first operation pattern corresponding to the first keyword and identifying, when the message includes the second keyword, a second operation pattern corresponding to the second keyword, and
the changing of the size comprises controlling the motor to change the size of the exposed display according to the first operation pattern or the second operation pattern.

20. The method of claim 11, wherein the event information is associated with at least one of an execution of a predetermined application, an execution of an application included in a predetermined category, a reception of a message including a predetermined keyword, an execution of predetermined multimedia, a number of applications operating in parallel, a reception of an input to a predetermined area of the flexible display, a size change of multimedia displayed on the flexible display, a number of texts displayed on the flexible display, a size of the text, a pupil movement of a user acquired through a sensor, message checking, non-checking of a message, playback of predetermined sound, and a predetermined user input, and
the predetermined user input comprises an input related to setting of an operation pattern of the motor.

* * * * *